(12) United States Patent
Davis et al.

(10) Patent No.: US 7,685,436 B2
(45) Date of Patent: Mar. 23, 2010

(54) SYSTEM AND METHOD FOR A SECURE I/O INTERFACE

(75) Inventors: John M. Davis, Brentwood, TN (US);
Richard Takahashi, Phoenix, AZ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 830 days.

(21) Appl. No.: 10/903,785

(22) Filed: Jul. 30, 2004

(65) Prior Publication Data

US 2005/0076228 A1 Apr. 7, 2005

Related U.S. Application Data

(60) Provisional application No. 60/507,976, filed on Oct. 2, 2003.

(51) Int. Cl.
*H04L 29/06* (2006.01)
*G06F 9/02* (2006.01)
*G06F 12/14* (2006.01)

(52) U.S. Cl. .................. 713/192; 713/153; 713/160; 713/193

(58) Field of Classification Search ............ 713/189, 713/160, 151, 153, 168
See application file for complete search history.

(56) References Cited

U.S. PATENT DOCUMENTS

| | | | |
|---|---|---|---|
| 5,432,950 A | 7/1995 | Sibigtroth | |
| 5,737,760 A | 4/1998 | Grimmer, Jr. et al. | |
| 5,892,899 A | 4/1999 | Aucsmith et al. | |
| 5,940,626 A | 8/1999 | Sollars | |
| 6,041,122 A | 3/2000 | Graunke et al. | |
| 6,049,876 A | 4/2000 | Moughanni et al. | |
| 6,101,255 A | 8/2000 | Harrison et al. | |
| 6,157,955 A * | 12/2000 | Narad et al. | 709/228 |
| 6,788,800 B1 * | 9/2004 | Carr et al. | 382/100 |
| 6,983,366 B1 * | 1/2006 | Huynh et al. | 713/168 |
| 7,095,716 B1 * | 8/2006 | Ke et al. | 370/230 |
| 7,493,659 B1 * | 2/2009 | Wu et al. | 726/26 |
| 2002/0066014 A1 | 5/2002 | Dworkin et al. | |
| 2002/0108059 A1 | 8/2002 | Canion et al. | |
| 2003/0014627 A1 * | 1/2003 | Krishna et al. | 713/153 |
| 2003/0196081 A1 * | 10/2003 | Savarda et al. | 713/153 |
| 2004/0010545 A1 * | 1/2004 | Pandya | 709/203 |

OTHER PUBLICATIONS

Motorola, Digital DNA, Technical Summary, MPC184TS/D, Rev. 1, Jun. 2002, MPC 184 Security Processor.

(Continued)

*Primary Examiner*—Nasser G Moazzami
*Assistant Examiner*—Fatoumata Traore
(74) *Attorney, Agent, or Firm*—Davidson Berquist Jackson & Gowdey, LLP

(57) ABSTRACT

A security processor performs all or substantially all security and network processing to provide a secure I/O interface system to protect computing hardware from unauthorized access or attack. The security processor sends and receives all incoming and outgoing data packets for a host device and includes a packet engine, coupled to a local data bus, to process the incoming and outgoing packets. The processor further comprises a cryptographic core coupled to the packet engine to provide encryption and decryption processing for packets processed by the packet engine. The packet engine also handles classification processing for the incoming and outgoing packets. A modulo engine may be coupled to the local data bus.

22 Claims, 10 Drawing Sheets

FIG. 2

OTHER PUBLICATIONS

Intel® IXP2400 Network Processor: Flexible, High-Performance Solution for Access and Edge Applications, pp. 1-7.

Intel® Addressing Next-Generation CPE Challenges, The Role of the Intel® XScale™ Technology-based Intel® IXP425 Network Processor in CPE, Intel® Internet Exchange Architecture, Feb. 2002, pp. 1-8.

Delivering the Next Generation of Broadband Services over the Last Mile, Introducing a New Multi-Service Processor Architecture™, Brecis Communications, Mar. 2001, pp. 1-8.

C-PORT™ A Motorola Company, C-5™ Network Processor Data Sheet, Supporting C-5 Network Processor Version DO, Jan. 21, 2002—Preliminary Version, pp. 1-96.

Donald L. Evans, Phillip J. Bond, Arden L. Bement, Security Requirements For Cryptographic Modules, Information Technology Laboratory, National Institute of Standards and Technology, Gaithersburg, MD, May 25, 2001 pp. i-viii, 1-61.

Patrick Crowley, Mark A. Franklin, Haldun Hadimioglu, Peter Z. Onufryk, Network Processor Design Issues and Practices, vol. 1, Chapter 2, pp. 12-13, 148-154, 172-175; Chapter 9, pp. 192-218; Chapter 10, 220-248; and Chapter 12, 250-275, Morgan Kaufmann Publishers, 2003, San Francisco, California.

Corrent's Families of Security Processors [retrieved on Apr. 10, 2003]. Retrieved from Internet: <URL:www.corrent.com>.

CommWeek. Startups take next step at NPU confab [online]. Robert Keenan [retrieved on Jun. 23, 2003]. Retrieved from Internet: <URL:www.eet.com>.

Corrent. The Security Processing Company. Corrent Introduces Industry's First Complete Security Processor Securing Next Generation Internet Transactions Today [online]. May 6, 2002, Las Vegas, NV [retrieved on Apr. 10, 2003]. Retrieved from Internet: <URL:www.corrent.com/press15.phtml>.

Corrent. The Security Processing Company. Socket Armor™ CR7020 SSL Security Processor [online]. [Retrieved on Apr. 10, 2003]. Retrieved from Internet: <URL:www.corrent.com/products_socket.phtml>.

Corrent. The Security Processing Company. Packet Armor™ CR7120 IPsec Security Processor [online]. [Retrieved on Apr. 10, 2003]. Retrieved from Internet: <URL:www.corrent.com/products_packet.phtml>.

Corrent. The Security Processing Company. Corrent Takes Industry Lead With Delivery Of Single-Chip Gigabit Speed Internet Security Processors [online]. Dec. 10, 2001, Tempe, AZ [Retrieved on Apr. 10, 2003]. Retrieved from Internet: <URL:www.corrent.com/press8.phtml>.

Corrent. The Security Processing Company. Corrent Offers Gigabit-rate VPN/SSL Performance With a Cost-Effective Enterprise and Server PCI Card Solution [online]. Dec. 2, 2002, Tempe, AZ [Retrieved on Apr. 10, 2003]. Retrieved from Internet: <URL:www.corrent.com/press20.phtml>.

Corrent. The Security Processing Company. Breakthrough Security Performance At Unparalleled Price Point From Check Point And Corrent [online]. Mar. 24, 2003, Redwood City, CA and Tempe, AZ [Retrieved on Apr. 4, 2003]. Retrieved from Internet: <URL:www.corrent.com/press24.phtml>.

Intel® IXP425 Network Processor Family [online]. 2002 [Retrieved on Sep. 10, 2002]. Retrieved from Internet: <URL:www.intel.com/design/network/products/npfamily/ixp425.htm>.

EETimes. Developers Must Balance NPU Programmability and Performance Issues [online] Aug. 5, 2002. {Retrieved on Sep. 10, 2002}. Retrieved from Internet: <URL:www.eetimes.com/in_focus/embedded_systems/OEG20020802S0032>.

TechWeb. Algorithm Hides Data Inside Unaltered Images [online] Colin Johnson, Jun. 23, 1999 [Retrieved on Sep. 16, 2002]. Retrieved from Internet: <URL:www.techweb.com/wire/story/TWB19990623S0001>.

Electronic Engineering Times, Headline: Broadcom [online] Mar. 4, 2002 [Retrieved on Sep. 6, 2002]. Retrieved from Internet: <URL:www.eetimes.com>.

Electronic Engineering Times, Headline: Security chip speeds SSL/TLS record processing [online] Jul. 8, 2002 [Retrieved on Sep. 6, 2002]. Retrieved from Internet: <URL:www.Broadcom.com>.

Motorola. MPC184: Security Processor [online] [Retrieved on Sep. 10, 2002]. Retrieved from Internet: <URL:www//e-www.motorola.com/webapp/sps/.../prod_summary.jsp?code=MPC184&nodeId=01M97321359772>.

* cited by examiner

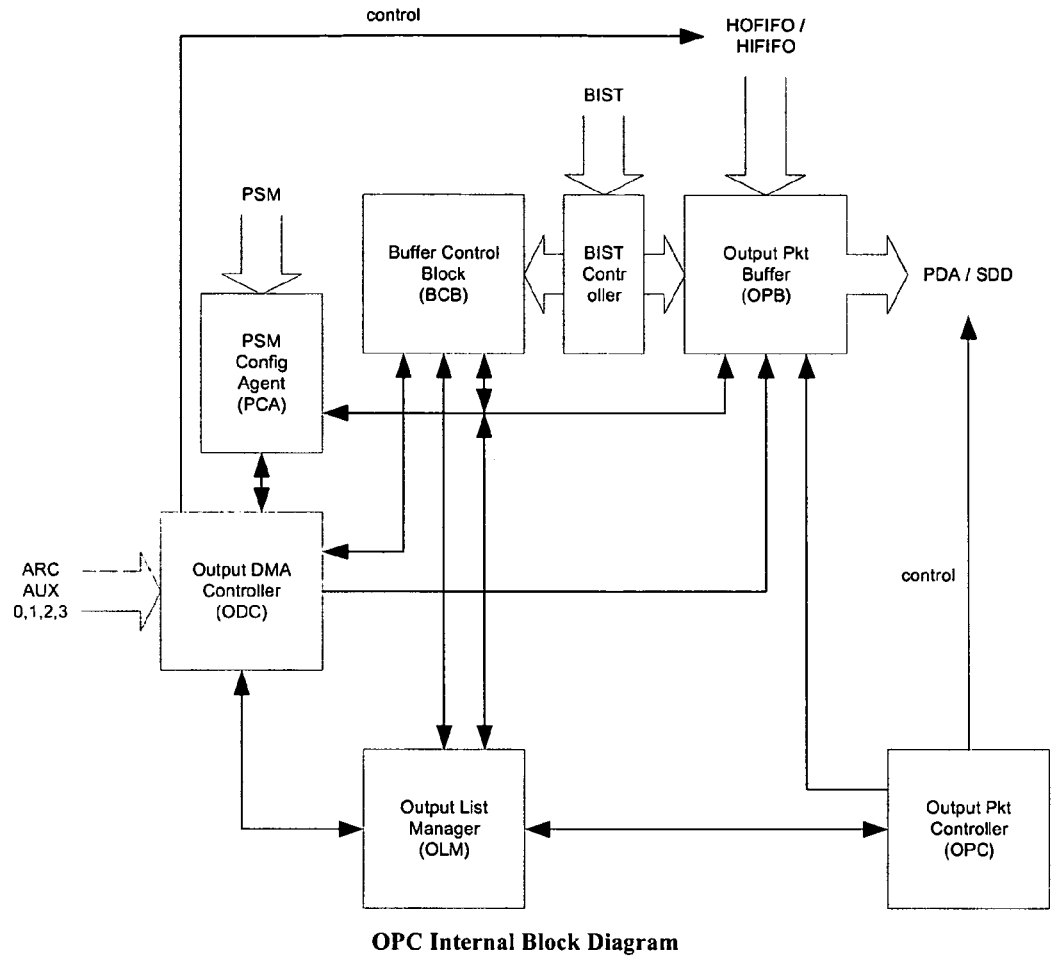

OPC Internal Block Diagram

Notation:
PDA=Packet DMA Agent, forwards packets to host or connected entity via DMA.
SDD=Streaming Data Director. The SDD transfers packets to Streaming IO (e.g. GMII, PL-3, etc).
PCA= PSM Config Agent module enables host access to some of the OLM registers, and it contains a few configuration registers itself. Also, the PSM can access the OPB and the BCB RAMs (allowing host access).

FIG. 10

SYSTEM AND METHOD FOR A SECURE I/O INTERFACE

RELATED APPLICATION

This application is a non-provisional application claiming benefit under 35 U.S.C. sec. 119(e) of U.S. Provisional Application Ser. No. 60/507,976, filed Oct. 2, 2003 (titled SYSTEM AND METHOD FOR A SECURE I/O INTERFACE by John M. Davis et al.; which is incorporated by reference herein.

FIELD OF THE INVENTION

The present invention relates in general to data communications, and particularly to secure cryptographic communications, and more particularly to a secure input/output (I/O) interface system for a computing device such as, for example, a host computer communicating using internet protocol (IP) data packets or other datagrams.

BACKGROUND OF THE INVENTION

Trusted internal computer networks are typically protected from un-trusted external computer networks by routers or other gateway systems that provide different types of firewall functionality. Security processing performed by related systems may also provide additional protection. For example, a computer in the internal network may establish a virtual private network (VPN) session with a computer in the external network. The host processor of the computer or a dedicated security processor coupled to the router or other gateway system typically performs the security processing necessary to support the VPN. In addition, a dedicated network processor may be coupled to the security processor and/or the host processor to handle network packet processing functions.

Network interface cards (NIC) often provide a computer's physical connection to its trusted internal network. More specifically, a NIC connects a personal computer, server or workstation to a local area network (LAN) and has two primary interfaces: the network interface and the host bus interface. NICs are typically low-cost ASIC-based products designed for simple buffering and data transfer.

It is desired that communications to and from a trusted computer be secure and that communication speeds be improved. However, providing firewall, network processing and security functionalities in different systems, which are often made by different manufacturers, provides increased opportunities for snooping or other techniques that may permit an unauthorized person to gain access to ongoing communications or to discover key or other security data when it is exchanged between subsystems. For example, if certain security functions associated with securing communications over a NIC are handled by the computer's host processor and/or by other computers on the internal network, then the communications may be more easily attacked or otherwise accessed or interfered with by an unauthorized person, who may attempt to exploit easier snooping access or other vulnerabilities presented by the processing of security functions by a host processor or another server on the network.

The use of different systems to perform different portions of security and network processing also requires additional processing and interfaces for coordinating communications processing between the systems. Such additional processing and interfaces increase processing demands, which limits communication speed and increases the size of the chips and systems necessary to implement secure communications.

As a specific example, when using a separate security processor and I/O card connected to a backplane bus of a host, input encrypted data is typically transferred using direct memory access (DMA) from the I/O card, under control of the host, to memory coupled to the host. Then, the data is transferred by DMA from the memory via the host to the security processor. After the data is decrypted, and possibly a public key generated, the data is transferred by DMA from the security processor to memory again via the host. Finally, the decrypted data is transferred by DMA from the memory to the I/O card for output to another destination. This large number of data transfers creates a bottleneck on the backplane bus, which includes multiple data transactions, many interrupts, and heavy usage of memory to store the data.

The use of secure communications in broadband networks will increasingly require high-speed security and network processing. Further, the use of portable devices that securely connect to networks will require smaller chip and system sizes that can meet security and networking processing demands while at the same time retaining easy portability. In light of the foregoing, there is a general need for a secure I/O interface system and method that improve the security of communications to and from trusted hardware, improve communication speed, reduce the number of different systems required for secure communications, and reduce the extent of the bottleneck on the backplane bus.

BRIEF DESCRIPTION OF THE DRAWINGS

The invention is pointed out with particularity in the appended claims. However, for a more complete understanding of the present invention, reference is now made to the following figures, wherein like reference numbers refer to similar items throughout the figures:

FIG. 10 is an internal block diagram illustrating the OPC in accordance with an embodiment of the present invention;

Figure 1:
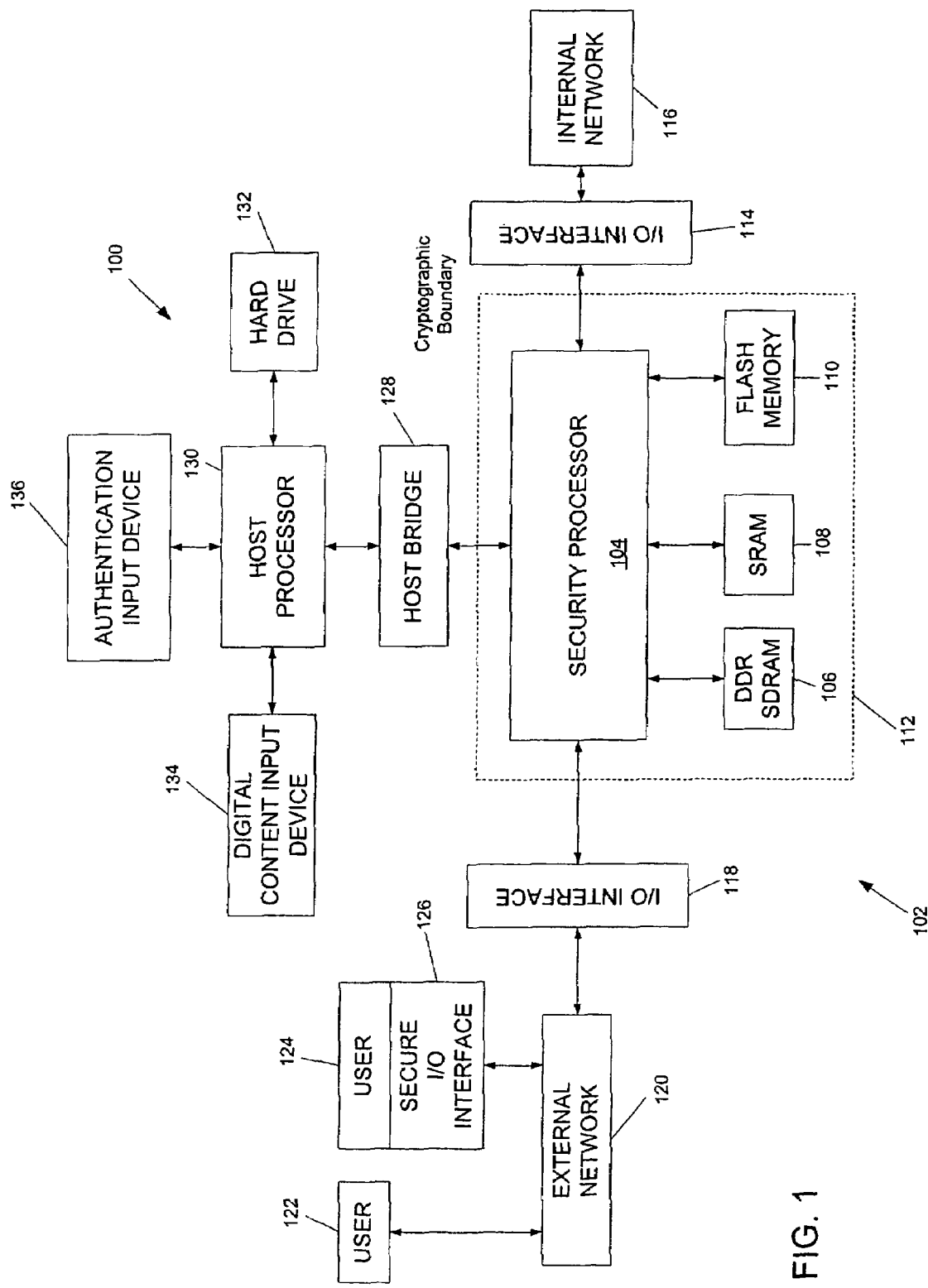
FIG. 1 illustrates a simplified functional block diagram of a system architecture suitable for use in implementing embodiments of a security processing system and method in accordance with an embodiment of the present invention.

The exemplification set out herein illustrates an embodiment of the invention in one form, and such exemplification is not intended to be construed as limiting in any manner.

DETAILED DESCRIPTION OF THE DRAWINGS

The following description and the drawings illustrate specific embodiments of the invention sufficiently to enable those skilled in the art to practice it. Other embodiments may incorporate structural, logical, electrical, process and other changes. Examples merely typify possible variations. Individual components and functions are optional unless explicitly required, and the sequence of operations may vary. Portions and features of some embodiments may be included in or substituted for those of others. The scope of the invention encompasses the full ambit of the claims and all available equivalents.

The present invention is described and claimed herein primarily with reference to the processing of "packets". However, as used herein, it is intended that the term "packet" or "packets" have the meaning and scope of the more generic term "datagram" or "datagrams."

In one embodiment, the present invention provides, among other things, a system and method for connecting a trusted piece of hardware, such as, for example, a personal computer, server, router, personal digital assistant (PDA), cellular phone, network-enabled device or other computing or communication device, to a network using an I/O interface or system that provides improved security for all or substantially all communications received and sent by the trusted hardware. The secure I/O system preferably may perform all security and network processing necessary to maintain secure communications by the hardware with other devices on internal or external networks. Alternatively, it may perform the network security processing essential to be segregated from other processing to ensure safe (i.e., protected) and efficient system or device operation. For example, the secure I/O system permits establishing a VPN with a computer on an external network. The VPN may be established using, for example, the standard IPSec internet protocol security, as described in "Request for Comment" (RFC) 2401, 2402 and 2406, which are incorporated herein by reference.

The secure I/O system of the present invention permits performing all or substantially all network processing functions and off-loads all or substantially all security functions associated with network address translation (NAT), the providing of a firewall, intrusion detection/protection system functionality, traffic proxying, and encryption from a host or network processor onto a single system or card, for example a NIC. This card may be inserted into each of the servers and other computers connected on an internal network.

The security processing performed by the secure I/O system typically may include encryption, decryption, signing and verification of packets at, for example, 100 megabits per second full duplex and greater speeds. For example, the secure I/O system of the present invention may provide wire speed performance, for example, of about 2-3 gigabits per second firewall and VPN throughput. The secure I/O system may simplify the deployment of security solutions on open platforms and appliances.

The elements that implement the various embodiments of the present invention are described below, in some cases at an architectural level. Many elements may be configured using well-known structures. The functionality and processes herein are described in such a manner to enable one of ordinary skill in the art to implement the functionality and processes within the architecture.

FIG. 1 illustrates a simplified functional block diagram of a system architecture suitable for use in implementing a security processing system and method in accordance with an embodiment of the present invention. Architecture 100 includes security processing system 102 comprising security processor 104, which may consolidate the processing of discrete or consolidated security functions and maintain the relationships and integrity of the stored security context and other information in memories 106, 108, and 110. Memories 106, 108 and 110 are coupled to security processor 104. Memories 106, 108 and 110 store, for example, cryptographic keys and other data used in security functions by security processor 104, and also store security associations and connection entries used in maintaining multiple security sessions with other computers. Memories 106, 108 and 110 also may be used to buffer inbound or outbound data packets awaiting security processing by security processor 104. Memory 108 may be used to support classification processing by security processor 104.

Security processing system 102 is preferably contained within cryptographic boundary 112 and provides a secure I/O interface for computing or communications hardware as described above. Cryptographic boundary 112 preferably complies with Federal Information Processing Standards Publication (FIPS PUB) 140-2 titled "Security Requirements for Cryptographic Modules", issued May 25, 2001, by National Institute of Standards and Technology (NIST), which is incorporated by reference herein.

Security processing system 102 may be coupled to internal network 116 by I/O interface 114 and to external network 120 by I/O interface 118. Interfaces 114 and 118 may perform physical (PHY) layer processing to convert a digital bit stream to or from an analog or photonic signal for transmission over a physical medium such as, for example, copper wire pairs, co-axial cable, fiber or air. Interfaces 114 and 118 are, for example, streaming data interfaces such as a Packet-Over-SONET Physical-Layer Three (POS/PHY3) type streaming interface, although 10/100 megabit (Mb) Ethernet, 1 Gigabit (Gb) Ethernet, UTOPIA, LX SPI-4 and other interface types may be suitable. By routing all or substantially all I/O to and from host processor 130 and/or internal network 116 through security processing system 102, host processor 130 and internal network 116 are substantially protected against unauthorized access or other security breaches, protecting the security information integrity, and providing processing and storage efficiency from information consolidation.

IP data packets are received from and transmitted to external network 120 and internal network 116 over interfaces 114 and 118. In other embodiments, security processing system 102 may include a number of additional interfaces to internal or external networks. Security processor 104 performs, for example, routing of data packets from external network 120 to appropriate destinations in internal network 116 and handles IPSec processing for both inbound and outbound data packets. Security processor 104 preferably handles all network and security processing functions for the data packets to provide the most secure I/O interface. However, in alternative embodiments, certain selected networking and/or security functions may be handled by other processors such as, for example, host processor 130. Examples of network and security processing systems and methods, and related communications interfaces and protocols, suitable for implementation in and with security processing system 102 are described in U.S. patent application Ser. No. 09/880,701 (entitled "METHOD AND SYSTEM FOR HIGH-SPEED PROCESSING IPSEC SECURITY PROTOCOL PACKETS" filed by Lee P. Noehring et al. on Jun. 13, 2001, which is now U.S. Pat. No. 7,194,766, issued on Mar. 20, 2007) and Ser. No. 10/160,330 (entitled "SYSTEM AND METHOD FOR MANAGING SECURITY PACKET PROCESSING" filed by Lee P. Noehring et al. on May 30, 2002), which applications are incorporated by reference herein.

Security processing system 102 may process packets delivered from internal or external networks 116 or 120 or from host processor 130. System 102 may, for example, handle thousands of separate IPSec tunnels at various packet sizes from 64 bytes and higher at a throughput of, for example, about 300 Mb per second or greater. System 102 may handle transport or tunnel mode IPSec.

Other computing devices may be coupled to external network 120. For example, user devices 122 and 124 may correspond to devices that may establish secure communication sessions with host processor 130 or another device on internal network 116. User device 124 may be protected using a secure I/O interface 126, which may be a hardware system similar to security processing system 102. User device 122 may use only its host processor and software to process secure communications through external network 120.

Security processor 104 may handle both so-called fast path and slow path processing functions. Fast path functions include time-sensitive processing such as, for example, packet classification, modification and forwarding, and slow path functions include, for example, system management and alarm functions and time-insensitive packet processing functions such as route calculation, unknown address resolution, firewall rule management, and routing table management. Packet classification generally involves matching information from an incoming packet to a table of connection entries (which may include state and context elements, and relations to encryption associations) stored in, for example, memory 106 or 108.

Security processing system 102 may be implemented, for example, as a stand-alone system box or as a card such as, for example, a NIC, that connects to a slot in the motherboard of a host system. Security processing system 102 may be coupled to host processor 130 using host bridge or interface 128. Host processor 130 may be coupled to hard drive 132, digital content input device 134, and authentication input device 136. Hard drive 132 may store, for example, a software application that communicates with the application program interface (API) of security processing system 102. Security processor 104 may send security-related information and data as requested to host processor 130, and may switch its I/O ports as requested by host processor 130.

Host bridge 128 may couple security processor to host processor 130 of, for example, a personal computer, server, or other computing or communications device. Host bridge 128 may be, for example, a peripheral component interconnect (PCI) interface, and in one embodiment, may be a 32 bit, 66 MHz PCI interface.

Authentication input device 136 may be, for example, a physical key or token, a smart card, or a biometric identification sensor. Authentication input device 136 may enable the authentication of a user attempting to access host processor 130. Authentication input device 136 may be directly attached, for example, to a serial, network, or EEPROM interface of host processor 130 using a physically segregated or covered transmission channel. Authentication input device 136 may act as a mechanism for enabling or modifying the functions of security processor 104, or as an information-loading mechanism, used for example in loading keys, uncovering keys, or modifying rules for device operation.

Digital content input device 134 may be, for example, a CD-ROM, portable storage device, or keyboard and provides digital data such as program code or security data to host processor 130.

Security processor 104 may provide the first inspection of incoming data from external network 120 to determine, for example, if the data is encrypted or in plain text form, and the type of security processing required, as may be determined by reading the header or other content of incoming data packets, and to set up a secure channel or process to handle the data, as may be requested for a security policy.

Security processing system 102 may include a unique identification (ID) number stored on a chip containing security processor 104 or stored in encrypted form in, for example, memory 110. Security processing system 102 may perform protected key generation in hardware, and protected keys are preferably never output from security processor 104 in plain text form.

Security processing system 102 may also serve as a trusted hardware device to authenticate another hardware security token connected on, for example, a common network. Security processing system 102 may be authenticated using authentication input device 136 and may provide the cryptographic processing for such authentication. Security processing system 102 may communicate verification or other information regarding the authentication status of input device 136 to host processor 130.

By performing all or most security and networking processing for I/O communications to host processor 130 in security processing system 102, a large proportion, for example, of greater than about 50-90 percent of VPN and firewall I/O data loops may be handled in security processing system 102 without intervention by host processor 130. In addition, all or most security and network exception processing may be handled by security processing system 102.

Security Processor

Figure 2:
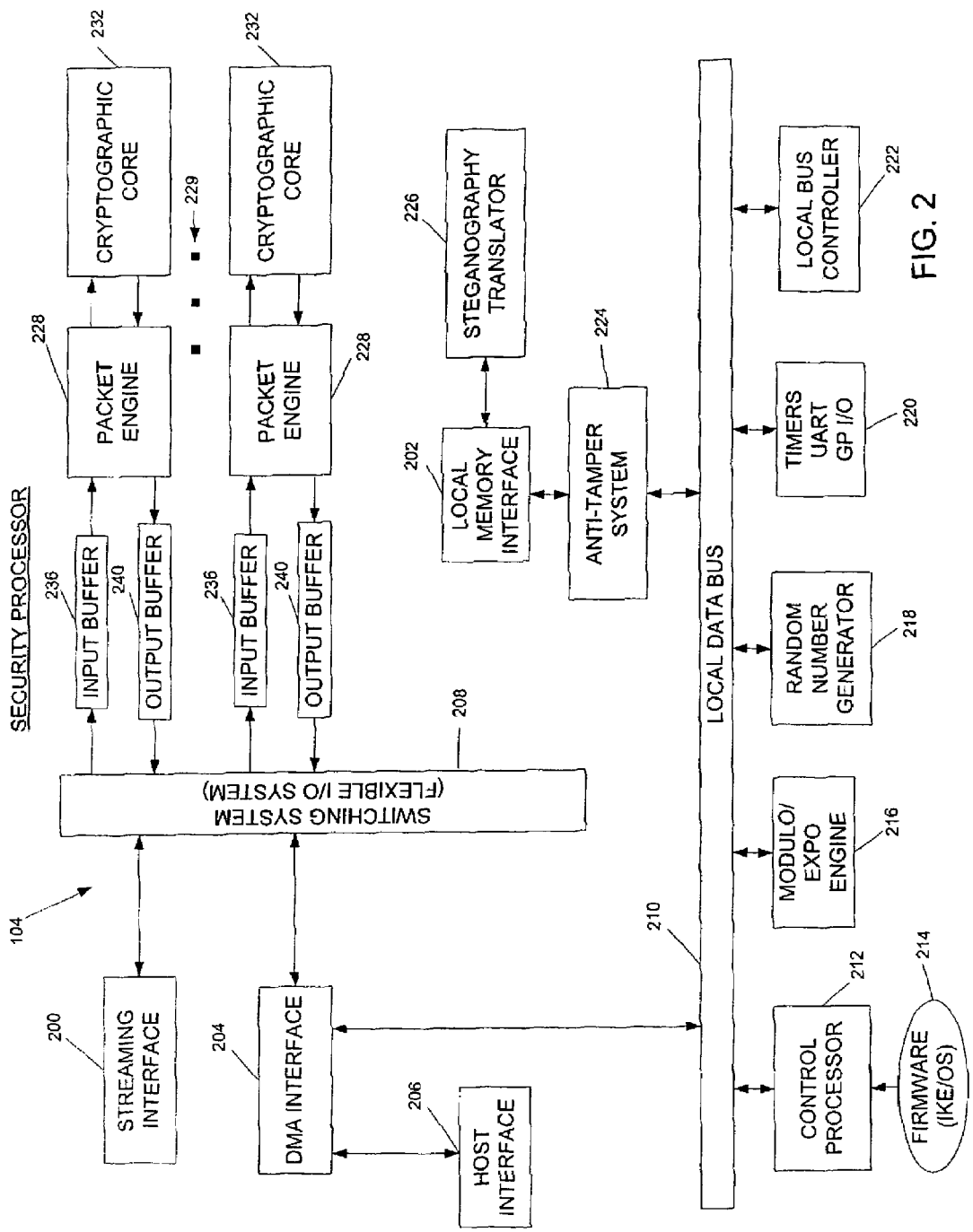
FIG. 2 illustrates a high-level simplified functional block diagram of a security processor in accordance with an embodiment of the present invention.

FIG. 2 illustrates a high-level simplified functional block diagram of security processor 104 in accordance with an embodiment of the present invention. In other embodiments of the present invention, other security processor configurations may be used in the system architecture of FIG. 1. Security processor 104 is preferably, though not necessarily, formed on a single chip.

Streaming interface 200 may be coupled for input and output to physical I/O interfaces 114 and 118 and supports fast path data flow to security processor 104. Host interface 206 may be coupled to physical host bridge 128 and supports slow path data flow and system management by host processor 130. Host interface 206 may be coupled to DMA interface 204. Both streaming interface 200 and DMA interface 204 may be coupled to switching system 208. Although only a single streaming and DMA interface are illustrated, more than one interface of each type may be used. For example, in one embodiment, streaming interface 200 may comprise three 10/100 Ethernet interfaces, and DMA interface 204 may comprise two DMA interfaces. Switching system 208 may be used to provide a switching mechanism to route packets and data to and from any of the I/O interfaces of security processor 104 and local data bus 210.

Local data bus 210 may be coupled to DMA interface 204 and operate under control of local bus controller 222. Local memory interface 202 may be coupled to local data bus 210 and may couple security processor 104 to memories 106, 108, and 110, which are typically provided on one or more separate chips although operating portions of memories 106, 108 and/or 110 may be provided on-chip with security processor 104. In other embodiments, more than one local data bus 210 may be used.

Local memory interface 202, and DMA interface 204 may be used, for example, by packet engines 228 to access memories 106 and 108 for classification processing and by control processor 212 for accessing firmware 214. Memory 106 may be, for example, a DDR SDRAM, and memory 108 may be, for example, an SRAM. Memory 106 may be made available to control processor 212 for operating system and code storage (for example, for firewall and internet key exchange (IKE) functionality, routing and network address translation (NAT) information, and firewall table entries). Memory 106 may be made available to packet engine 228 for access to specific firewall information, and stored security policies and associations. Memory 106 may be made available to cryptographic core 232 to store security association and key information. Memory 106 may also be made accessible via host interface 206 to host processor 130. Alternatively, a portion or all of the security association data may be stored in a memory, for example an SRAM (not shown), on-chip in security processor 104.

Memory 108 may be made available to both control processor 212 and each packet engine 228. Memory 108 may be used to aid in rapid lookups supporting packet engine 228 in classification and forwarding decisions. Memory 110 may be, for example, flash memory to provide non-volatile storage, for example, for boot memory and certain key storage. The boot code used to load firmware for execution by security processor 104 may optionally be authenticated using a mechanism internal to security processor 104 prior to its operation.

Switching system 208 may provide a flexible I/O system that allows packet processing engines or packet engines 228 to communicate high-speed data with several different types of interfaces including, for example, streaming interface 200 and direct memory access (DMA) interface 204. A non-limiting example of a switching system and method that are suitable for use with the present invention is described in U.S. patent application Ser. No. 10/172,814 (entitled FLEXIBLE I/O INTERFACE AND METHOD FOR PROVIDING A COMMON INTERFACE TO A PROCESSING CORE, filed by Swaroop Adusumilli et al. on Jun. 12, 2002, which is now U.S. Pat. No. 7,072,996, issued on Jul. 4, 2006), which is hereby incorporated by reference. Alternatively, switching system 208 may be implemented using conventional switches. Switching system 208 may provide a common bus interface to packet engines 228.

More specifically, switching system 208 may arbitrate between streaming and DMA interfaces to provide a common interface for packet engines 228 to permit communication of differing types of data over a plurality of bus types that implement different bus protocols and/or standards. The use of switching system 208 with DMA interface 204 may permit packets and other data to be routed using direct memory access among control processor 212, each of packet engines 228, and external memory such as memories 106 and 108. In one embodiment, individual packets may be routed within security processing system 102 using DMA.

Switching system 208 may select the I/O port or interface, including host interface 206, to use for data packets based on the results of cryptographic or other security or network processing. For example, packets classified for forwarding to another destination after a security operation (such as encryption or new connection validation) could be directed to the proper egress port, while packet data requiring host inspection (such as IKE messages, or exception or initial packets for firewall classification) could be redirected to DMA interface 204. In contrast to prior systems that rely on external bus interfaces to re-direct packet traffic to varying packet processing devices, the present invention may permit simplifying or collapsing the schema and protocols used, for example, in firewall, routing, NAT and IPSec processing with the result that lookups, transforms, and other application activity are more efficient. Prior systems typically require context labeling or other data envelopment or tagging to manage packet workflow among varying processing devices.

Switching system 208 may also include the ability to perform packet spanning. Spanning generally refers to a capability in managing network data flow that duplicates a selected traffic flow through an additional port for analysis by a traffic analyzer or intrusion detection system. The term "spanning" includes within its meaning, but is not necessarily limited to, functionality associated with the use of switched port analysis (often designated by the acronym "SPAN"). Unlike the all-or-nothing port duplication capabilities of typical existing network switches having a SPAN capability, the spanning function of switching system 208 may selectively identify flows of traffic and then stream duplicate packets or other datagrams via DMA interface 204 to control processor 212 or to, for example, another integral MIPS or associated control processor (not shown) that may be included in security processor 104.

Figure 9:
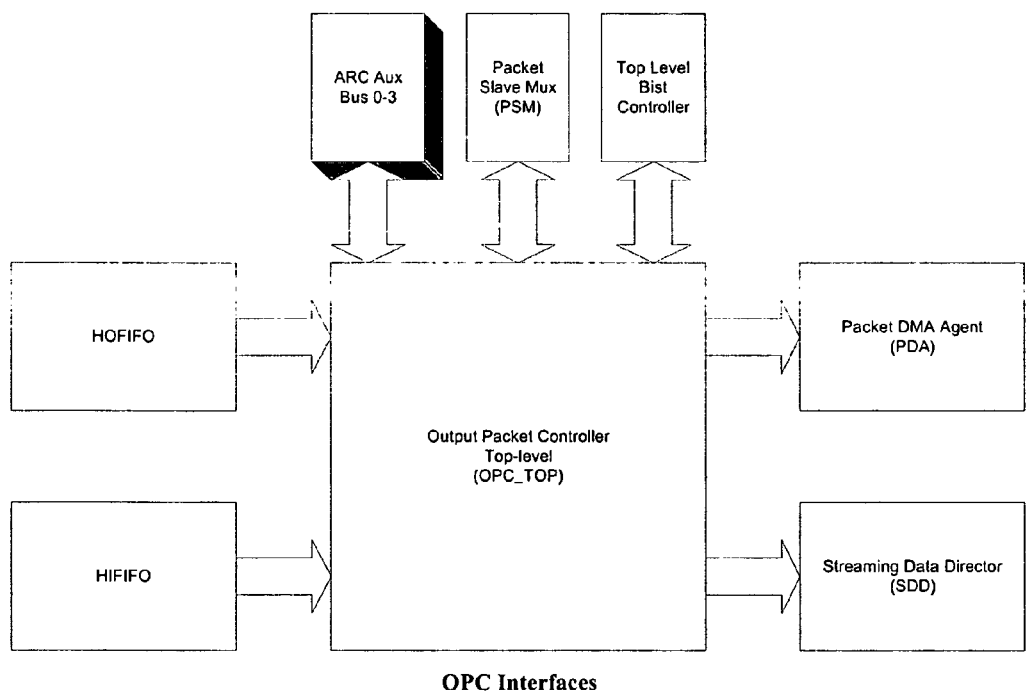
FIG. 9 is a block diagram illustrating the OPC interfaces in accordance with an embodiment of the present invention.

Typical data traffic that will not be spanned (i.e., non-spanned traffic) flows from one of packet engines 228 to, for example, an output packet cache (OPC). The OPC is an intermediate buffer to switching system 208 for outgoing packet traffic that will leave security processor 104 through DMA interface 204 or streaming interface 200. FIG. 9 is a block diagram illustrating the OPC interfaces.

At the OPC, this outgoing packet traffic may be placed on an active list (for example, a list of 64-byte memory structures residing in the OPC) for transmission out of interface 204 or 200 (for example, a PDMA or GMII interface). The OPC may be implemented, for example, as an embedded memory structure or in external memory and may be coupled between a packet engine 228 and one of the external interfaces of security processor 104. The use of the spanning feature is preferably configurable and may be selected by the system or operator. This feature is preferably implemented primarily using the OPC. FIG. 10 is an internal block diagram illustrating the OPC.

More specifically, the OPC may include an output packet buffer (OPB) memory (e.g., a RAM) for buffering output data, and a buffer control block (BCB). The BCB is typically a set of pointers stored in memory that each refer to memory locations of the output data. The BCB may maintain metadata such as, for example, start-of-packet, end-of-packet, error, sequence number, pointer to next BCB in chain, and other metadata. The BCB is preferably used to manage the active lists and the free list for the linked-list allocation scheme. When logically dictated during the operation of security processor 104 such as, for example, in the case of a five-tuple match result from a lookup engine, a NIDS engine match to packet type, or particular TCP state, or some other pattern within a datagram that is of interest to the system operator, a control bit or flag (sometimes referred to as a "SPAN bit" herein) may be set or some other notification may be sent by packet engine 228 to notify the BCB for packet data that is transiting the OPB memory, including the output device or interface that will be used. When a packet that will not be spanned (i.e., a "non-span packet") is stored in the OPC, a "DONE" flag, for example, is set to zero for each such non-span packet, and each non-span packet may be queued for egress out through an appropriate interface (i.e., streaming interface 200 or DMA interface 204).

After the memory pointed to by the BCB is drained (i.e., data is read or outputted out of that location into another location), the BCB "DONE" flag may be set to allow the memory to be overwritten. Alternatively, another method may be used to move output buffer data from the "active list" to the "free list". When a spanned packet is sent to the OPC from packet engine 228, a separate bit may be set (this separate bit is referred to herein as a "SPAN" bit). The SPAN bit may be used to initiate alteration of the behavior of the OPC. The packet may be streamed out through the original targeted egress interface (e.g., streaming interface 200 or data interface 204), but before releasing the data memory area pointed to by the BCB, the data may be drained out via a designated interface, for example DMA interface 204 to control processor 212 or to host processor 130. After such a packet is successfully duplicated using DMA interface 204, the BCB may be set to free the memory to be overwritten as described above.

In an alternate embodiment, the BCB or some other memory control mechanism could maintain an active list and a free list and place the active data blocks of OPB memory (i.e., re-map the pointers) from the active list to the free list when the packet data is streamed out. When the SPAN bit is set, the data would first be streamed to the alternate interface (such as, for example, DMA interface 204) in addition to its primary target output interface prior to moving the data blocks to the free list. After spanned data has been drained to control processor 212 or host processor 130, the spanned data is available to other processors or systems for any desired subsequent actions such as, for example, logging, analysis for intrusion detection, or transcription.

The foregoing approach may be particularly useful for network intrusion detection functions. When one of the defined actions for a certain packet traffic type is to log the packet, the above approach permits security processor 104 to act substantially as an in-line tap, which permits selectively duplicating streams of data that may be of interest based on specific pre-selected criteria. When NIDS 302 returns a potential signature match to one of packet engines 228, and that packet engine 228 is able to verify that the potential signature match is a true positive match, packet engine 228 may set the SPAN bit for that packet so that it is duplicated to control processor 212 and/or host processor 130 as discussed above. This verification may, for example, be based on the protocol of the packet or other appropriate criteria. Control processor 212 and/or host processor 130, as is applicable, may then run further analysis on the packet or the packet stream, and/or may forward it to a centralized IDS collector for enterprise intrusion detection.

Alternatively, the packet or packet stream may be re-directed or duplicated to host processor 130 for further processing. Such processing may include, for example, upper-layer cross-packet analysis, packet normalization, data mangling, or other operations. The packet may be forwarded out through the appropriate interface (e.g., streaming interface 200 or DMA interface 204) after such post-analysis or post-processing.

Packet engines 228 may each be interposed between a cryptographic core 232 and the switching system 208 as shown in FIG. 2. Packet engines 228 may each comprise microprocessors customized for packet operations such as, for example, packet processing and classification. Examples of packet engines suitable for use with the present invention are described in detail in U.S. patent application Ser. No. 09/880,701 (entitled "METHOD AND SYSTEM FOR HIGH-SPEED PROCESSING IPSEC SECURITY PROTOCOL PACKETS" filed by Lee P. Noehring et al. on Jun. 13, 2001), which is incorporated by reference herein. Each packet engine 228 may, for example, process packets needing initial NAT processing and firewall table entry setup, process packets corresponding to existing NAT and firewall tables, and process IPSec packets.

More specifically, each packet engine 228 may perform hash table lookups to a firewall connection table entry, which may contain state information, a rule to be applied to a packet, optional security association information, routing information (for example, for MAC overlay), and any application level gateway (ALG) packet mangling to be done.

For outbound IPSec traffic, each packet engine 228 may provide a pointer to security association data for an IP packet, load a security association database entry into a local buffer located on or off-chip, construct and add an outer IP header and IPSec header, perform lifetime checks, and update an associated security association database (SAD) entry (for example, the sequence number and byte count).

For inbound IPSec traffic, each packet engine 228 may locate an associated SAD entry by using a security policy index (SPI) number from the IPSec header or by an SAD address provided by the classification of the destination address, protocol and SPI. In order to use the SPI number, IKE firmware 214 may define the inbound SPI number from the API provided for security processor 104 during security association establishment. Packet engine 228 may then load the SAD entry into a local buffer, perform anti-replay checks and lifetime checks, and then update the SAD entry. Each cryptographic core 232 may remove tunnel IP headers, ESP or AH headers, and ESP trailers. The packet may then optionally be redirected through packet engine 228 for a firewall connection table lookup.

Packet engines 228 in FIG. 2 represent one or more packet engines that may be provided in parallel in security processor 104. The optional presence of additional packet engines 228 is indicated in FIG. 2 by ellipsis 229.

Input and output buffers 236 and 240 may be provided to couple each packet engine 228 to switching system 208. Buffers 236 and 240 may be, for example, FIFO buffers. In one embodiment, each of output buffers 240 may read control data prepended to the data payload as an in-band instruction set that determines the distribution direction or interface of the packet by switching system 208. Input and output buffers 236 and 240 may each have a size of, for example, 16-32 kilobytes (KB). An alternative is to have a direct control interface provided to couple each packet engine 228 to switching system 208, for out-of-band signaling of the packet data distribution direction. Roughly stating the foregoing in another way, instructions may be sent either from a packet engine 228 to switching system 208 either in-band, as prepended control words, or out-of-band, via a discrete control channel.

Packet engines 228 may be interconnected at the packet level for passing a packet and associated context information to other functional blocks or to each other for specific processing. In parallel operation, the individual packet engines 228 may each independently process discrete packets and forward the packets to other devices, such as cryptographic processing cores or switches. Two or more microprocessors could, for example, be serialized to perform discrete functional tasks as the packet transits from one functional block to another. Packet engines 228, in conjunction with cryptographic cores 232 and under the common control of control processor 212, may perform, for example, firewall lookup and statistics, IPSec and secure sockets layer (SSL) processing, quality of service (QoS), traffic management, and public key processing. Packet engines 228 may be programmable through registers (not shown), which may be configured by an external driver or initialization program. Each packet engine 228 may perform any needed datagram modification prior to sending a packet out from security processor 104. For example, packet engine 228 may write a MAC destination address to a packet as it streams out of processor 104.

In one embodiment, all incoming packets to security processor 104 may be initially processed by one of packet engines 228. Each packet engine 228 may classify the packet based upon a lookup table result and then may apply a variety of operations including, for example, forwarding with necessary transform parameters to cryptographic core 232, or forwarding to control processor 212 for application level processing. Such operations may further include overwriting portions of the packet with new data such as, for example, the media access control (MAC) header for forwarding and the IP header for NAT, and may also include dropping the packet, or passing the packet through security processor 104 to an egress interface, such as, for example, streaming interface 200, unchanged.

Cryptographic cores 232 may provide security processing to perform, for example, IPSec and/or SSL processing. Each cryptographic core 232 may provide high-speed fixed function encryption and authentication hash processing for packet data. Each cryptographic core 232 may receive instructions and key address information affixed to a packet for applying appropriate transforms. Examples of cryptographic cores 232 suitable for use with the present invention are described in the following U.S. patent applications, all of which are incorporated herein by reference: Ser. No. 10/144,004 (entitled "SINGLE-PASS CRYPTOGRAPHIC PROCESSOR AND METHOD" filed by Satish N. Anand et al. on May 13, 2002, which is now U.S. Pat. No. 7,266,703, issued on Sep. 4, 2007); Ser. No. 10/144,332 (entitled "SECURITY ASSOCIATION DATA CACHE AND STRUCTURE" filed by Satish N. Anand et al. on May 13, 2002); Ser. No. 10/144,195 (entitled "APPARATUS AND METHOD FOR A HASH PROCESSING SYSTEM USING MULTIPLE HASH STORAGE AREAS" filed by Satish N. Anand on May 13, 2002, which is now U.S. Pat. No. 7,213,148, issued on May 1, 2007); and Ser. No. 10/144,197 (entitled "APPARATUS AND METHOD FOR A HASH PROCESSING SYSTEM USING INTEGRATED MESSAGE DIGEST AND SECURE HASH ARCHITECTURES" filed by Satish N. Anand on May 13, 2002).

It should be noted that each cryptographic core 232 is preferably accessible only through a corresponding packet engine 228. Alternatively, several packet engines 228 may access a single cryptographic core in a round robin or other arbitrated flow mechanism. Accordingly, all or substantially all packet and data flow may return to the corresponding packet engine 228 from cryptographic core 232 prior to output from security processor 104. Also, in a preferred embodiment according to the present invention, all I/O data to security processor 104 transits one of cryptographic cores 232 whether or not the data needs encryption/decryption or other security processing. After exiting cryptographic core 232, a packet may be assigned its distribution directions (for example, to a destination of one of several streaming interfaces 200 or control processor 212) by packet engine 228 for distribution through switching system 208.

Streaming interface 200, switching system 208, packet engines 228 and cryptographic cores 232 may provide fast path data flow for security processing system 102. This fast path data flow may provide both firewall and virtual private network (VPN) functionality along with network intrusion detection functionality as described further below. Control processor 212 and firmware 214 may provide all or substantially all control for these firewall, VPN and network intrusion functions.

Initial packets for a data flow may transit from packet engine 228 and cryptographic core 232 to control processor 212 for an initial classification. Control processor 212 may perform firewall, NAT, and routing classification for the packet, and further may create a connection table and hash entry in memory 106 for use by packet engine 228 on subsequent packets in the data flow. This may include the building of more than one connection table entry, depending on the application. Examples of this include preemptively constructing inbound and outbound entries, as well as a data channel entry for certain protocols. Control processor 212 may also trigger IKE processing as a result of the classification of the initial packet.

The connection table entries above provide a mechanism that allows the acceleration of security operations, such as firewall or NAT decision processing for packets. Connection entries may have a relationship (for example, one-to-one or many-to-one) to IPSec SAD entries in support of IPSec operations as a result of classification.

Control processor 212 may provide control plane operations for security processing system 102 and may run an embedded operating system or simple task scheduler to handle complex packet applications such as, for example, firewall and intrusion detection system applications, a TCP/IP stack including routing functions, and support applications such as IKE and user interfaces for configuration, for example, from host processor 130. The use of control processor 212 in the foregoing manner may permit the complete containment of all key generation, public key and symmetric key encryption and decryption processing within the hardware of security processing system 102 and within cryptographic boundary 112. Control processor 212 allows the flexibility of general purpose processing for non-real-time, demand-driven or OS-based applications to be executed.

Modulo/expo engine 216 may be coupled to local data bus 210 to provide processing for streaming and modular exponentiation. Control processor 212 may provide public key macro acceleration by providing pre-processing for modulo/expo engine 216, which would permit host processor 130 to request high-level public key acceleration calls that are handled completely by security processing system 102. Modulo/expo engine 216 may be made accessible to control processor 212 and also host processor 130. The interconnectivity of operations that may be provided by control processor 212, specifically the providing of key management functions, modulo/expo engine operation and local access to encrypted/protected memory, allows security processor 104 to keep all unprotected cryptographic keys and operations within the boundary of security processor 104. In other embodiments, a dedicated key management processor (not shown), which may be coupled to local data bus 210, and associated firmware may be integrated and made accessible to modulo/expo engine 216 in addition to or even in the absence of control processor 212.

Firmware 214 may be executed by control processor 212 and may provide operating system software and other software to provide IKE and other functions and additional functions known to one of skill in the art. Control processor 212 may be, for example, a general purpose processor such as a 32-bit RISC processor. Other types of processors may also be used. Other software stored as part of firmware 214 may be used to permit control processor 212 to provide VPN, firewall, intrusion detection/prevention, and SSL protocol communications, virus protection, digital rights management, content filtering, access control, verifying of application integrity, and management of public key infrastructure (PKI) exchanges.

Additional software stored as part of firmware 214 may permit a wide variety of data analysis functions including, for example, packet analysis, pattern matching, or other data analysis. Statistics may be generated by such functions and/or other functions and the results communicated to host processor 130 or another device (not shown) for central data collection of activity on devices coupled to internal network 116.

Firmware 214 may include control plane software that runs on control processor 212. The control plane software may communicate with the data plane software using a set of application program interfaces (APIs) and a message-based protocol. The data plane software may include forwarding software responsible for performing high-speed packet processing that handles the data plane steady-state portion of networking applications, such as, for example, IP packet forwarding protocols. The functionalities provided by security processing system 102 may be changed and/or updated by updating firmware 214. Such updating may be done, for example, as new industry or government security standards are developed or modified. Also, the resources devoted to each of the security and networking processing functions may be customized for each host computing device or by the location of a device on a network, for example a location at either a gateway or at an edge of the network.

Security processor 104 may include random number generator (RNG) 218 and timers, universal asynchronous receiver/transmitter (UART), and general purpose I/O 220 coupled to local data bus 210. RNG 218 may be a true digital random-number generator. RNG 218 may be made available to control processor 212 and also to host processor 130. Timers 220 may operate most operations in the core of security processor 104 and may run, for example, at a frequency of about 150 MHz. A separate reference clock (not shown) may be coupled to control processor 212, which may be bridged to the security processor 104 core, and run, for example, at about 250 MHz.

Security processor 104 optionally may include anti-tamper system 224. Anti-tamper system is controlled by control processor 212 and may include detection circuits for voltage, temperature and physical probing forms of tampering. More specifically, anti-tamper system 224 may comprise hardware tamper circuits and firmware routines to check the integrity or health of stored flash content. The firmware routines may check the general integrity or health of the flash content using, for example, both DES-MAC or AES-MAC security methods or other hashing and authentication techniques. Anti-tamper system 224 may be implemented as a network of detection circuits tied to a fail-safe fault collector (not shown).

Translator 226, which may be, for example, a steganography translator or another memory obfuscation device or encryption translator, such as an encryption filter, may optionally be coupled to local memory interface 202 to use known steganographic or encryption techniques, as applicable to the type of device 226 used, in the writing and reading of security keys and other data to and from memories 106, 108 and/or 110. For example, an encryption key of, for example, about 112 bits may be distributed in an SRAM memory 108 in a data block size of, for example, about 100,000 bits and only be retrievable from memory 108 using a translation algorithm implemented in software in translator 226.

Encrypted Memory System

Figure 12:
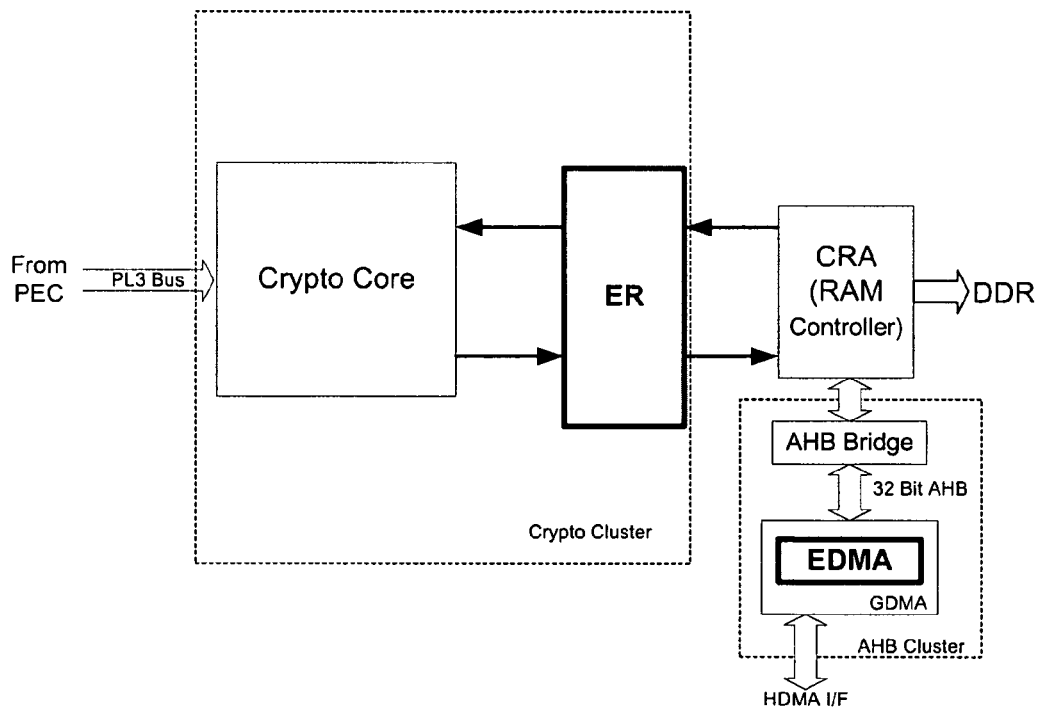
FIG. 12 is a block diagram illustrating the relationship between the ER block, the EDMA block, the cryptographic core, and memory in accordance with an embodiment of the present invention.

A hardware encryption path may be included between local data bus 210 and a memory controller block in security processor 104. This path may consist of two main components: (i) an encryption DMA block (EDMA) that may be a write-only path between a local host and off-chip memory (e.g., memory 106) for securely storing SA (security association) keying material; and (ii) an "ER" block that may be a read path from the memory controller block to the block from which a calling function is originating (for example, a cryptographic function running in cryptographic core 232 that uses SA keys for IPSec processing). The hardware encryption path as described herein may in general be useful with any off-chip memory, including for example, memory 106, 108, or 110. FIG. 12 is a block diagram illustrating the relationship in this embodiment between the ER block, the EDMA block, cryptographic core 232, and memory. The division of memory access shown could be physical (block connection) or logical (access to targeted address ranges that are encrypted). The EDMA block may consist of several blocks including an AES encryption block (e.g., 18-round AES with a 64-bit block size), an address expansion block, a control block, and a configuration block. The EDMA may sit between DMA interface 204 and an "AHB master block" (see FIGS. 6 and 7), which is coupled to the memory controller block (as discussed in more detail below). As discussed in more detail below and as illustrated in the figures, the AHB may be an internal AMBA host for the chip. AMBA refers to the Advanced Microcontroller Bus Architecture.

The EDMA block monitors signals from, for example, DMA interface 204 to determine if the current write request from DMA interface 204 to the AHB master block is, for example, for an IPSec SA, and/or SSL SA, or for a transfer which does not contain any SA data. This distinction may be controlled by two control bits in a control word associated with DMA interface 204 and used for each transfer. If the transfer is for an IPSec SA, the EDMA logic may hold off the request going to the AHB master block until the AES block is ready e.g., when the initial 10 rounds of AES processing are complete). The AES block may use the SA source address and an internally generated key (K) to complete the initial 10 rounds. On completion of the 10 rounds, 64-bits, for example, of Cipher Text 0 (CT0) will be produced, and the write request will be allowed to pass to the AHB master block. The AHB master block will assert its read signal and the first 8 bytes of data (a Basic Command Word [BCW], which is control data not needing confidentiality protection) will be allowed to transfer as cleartext. On each of the remaining transfers, the AES block will step one round of the AES algorithm per each transfer, and the data will be XOR'ed with $CT_n$ (n=0 . . . 8) to produce a value $EDMA_K[Data_n]$ (n=0 . . . 8) for a total transfer of 80-bytes, of which 72 bytes are encrypted. The EDMA preferably will not encrypt any transfer where the source address equals the destination address.

Figure 11:
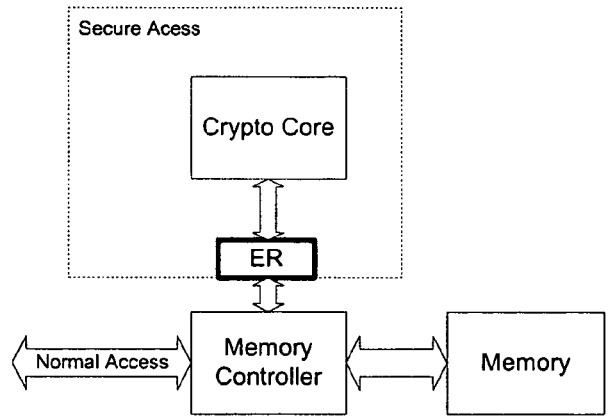
FIG. 11 is a block diagram illustrating the relationship of the ER block to the cryptographic core and memory in accordance with an embodiment of the present invention.

The ER block may provide a path from memory 106 (e.g., off-chip SA DDR) to cryptographic core 232 for decrypting SA's that are located within memory 106. The ER block may consist of several blocks including an AES encryption block (e.g., 18-round, 64-bit AES), an address expansion block, a variable FIFO, a control block, and a configuration block. The ER block may be located between the calling functional block (e.g., cryptographic core 232 or another block) and memory 106. The ER block may be read-only, or it may be read-write, if necessary to, for example, copy back state information. FIG. 11 is a block diagram illustrating the relationship in this embodiment of the ER block to the cryptographic core and memory.

The ER block may monitor the calling functional block's request signals to memory 106. If the request is a read, the ER block will hold off the completion of the read by de-asserting its ready signal ("ER_rdy") to a memory arbiter until the AES block is ready (i.e., when the initial 10 rounds of the AES algorithm are complete). The memory arbiter (e.g., a RAM arbiter) brokers access requests from the requesters of memory (e.g., a MIPS processor, one of packet engines 228, or cryptographic core 232). Signal ER_rdy may be transmitted to the memory controller (see the "CRA" block in FIG. 12) from the EDMA or the ER control element.

The AES block may use the SA source address provided from the interface to cryptographic core 232 and the K key to complete the initial 10 rounds of the AES algorithm. On completion of the 10 rounds, 64-bits of Cipher Text 0 (CT0) will be produced and the ready signal (ER_rdy) may be asserted allowing the read request to pass to the memory arbiter. The memory arbiter will assert its data ready signal and the first 8-bytes of data (the BCW) will be allowed to transfer in the clear. On each of the remaining transfers, the AES block will step one round of the 64-bit AES algorithm per transfer, and the data will be XOR'ed with $CT_n$ (n=0 . . . 8) to produce values $E1_K[Data_n]$ (n=0 . . . 8) for a total transfer of 80 bytes, of which 72 bytes are decrypted. More generally, the ER block may decrypt or encrypt to arbitrary offsets per each read or write request, intermingling data stored in the clear with data stored in an encrypted form so as to make a clear text delivery to the calling functional block.

Now discussing an encrypted hardware path according to the present invention in more detail, an encrypted memory system may be implemented as a multi-block system tasked with the selective encryption of memory structures to protect data that may reside in off-chip memory (e.g., memory 106, 108, or 110, as mentioned above) from use by anything other than the intended block and/or logic that resides in the system itself. It is particularly useful in encryption devices and applications such as with the IP Security protocol where one wishes to achieve FIPS 140-2 level 2 or similar levels of protection for data and process contents.

The specific embodiment of the present invention discussed here preferably has two primary blocks. First, the EDMA block may provide logic and a protected path from, for example, a host general purpose DMA interface to the memory controller. This is the path over which the encrypted data may be written to memory. The utility of the EDMA block is to provide a method of inserting data into memory, encrypting it enroute. Second, the ER block may provide a fast decryption path for data read from external memory. The ER block is accessible only to trusted requestor blocks within the chip, making retrieval and decryption of certain protected memory data discriminatory, based on purposeful hardware design. An encryption key K may be used for encryption and decryption of the externally stored data. K is preferably internally generated at initialization and not visible nor accessible outside the system.

Data Representation Conventions

Figure 5:
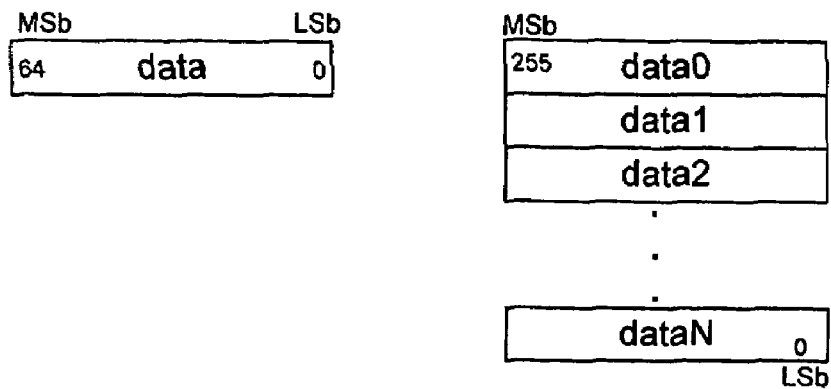
FIG. 5 illustrates a data representation convention used herein.

FIG. 5 illustrates the data representation convention used herein for purposes of explanation. Other conventions may be used in different embodiments. Throughout the description herein, all data vectors and one-dimensional data structures are represented with the Most Significant Bit (MSb) in the leftmost position and the Least Significant Bit (LSb) in the rightmost position. All two-dimensional data structures are represented with the MSb in the upper leftmost position and the LSb in the lower rightmost position.

EDMA Block (GDMA to Off-Chip Memory)

Figure 6:
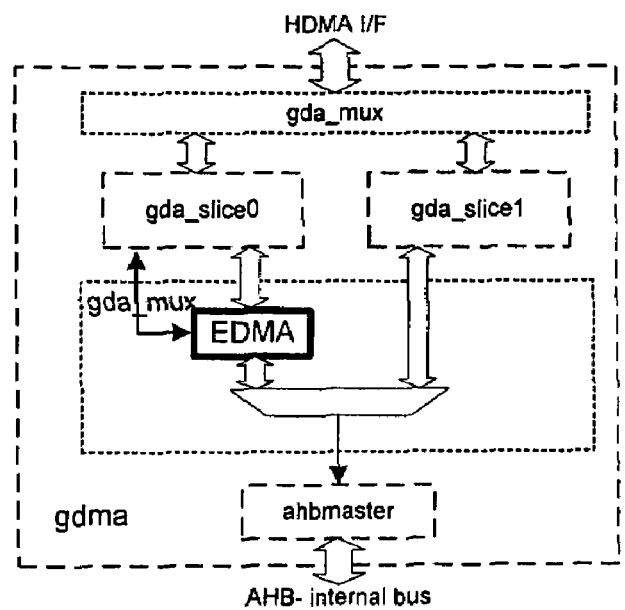
FIG. 6 is a block diagram illustrating the GDMA block, which incorporates an EDMA block, in accordance with an embodiment of the present invention.

The EDMA block may provide a write-only path between a local host or other data generating device and the off-chip memory for securely storing protected information, such as SA keying material. It may consist of several blocks that include an N round B block AES encrypt (where B is the width of the memory interface), address expansion, control, and configuration. An AES algorithm of 128-bit key size is typically used though other key sizes may be used with the appropriate adjustment in key expansion rounds. Likewise, some other streaming or block cipher may be used in an alternate implementation. The EDMA block sits between the interface from the data path and the bus to the memory controller. In one implementation the EDMA may be located between the "GDMA" block and the "AHB" block (see FIGS. 6-8). The GDMA (general purpose DMA) block may interface the internal or external host to the AHB. The AHB master is the mechanism for the functional block (e.g., the GDMA block or packet DMA [PDMA]) to take control of the bus for signalling and data transmission. Alternatively, in a multi-path (parallelizing) design, the EDMA block could be located between the GDMA Slice0 (gda_sclice0) and the GDMA multiplexer (mux) as illustrated in FIG. 6.

Figure 7:
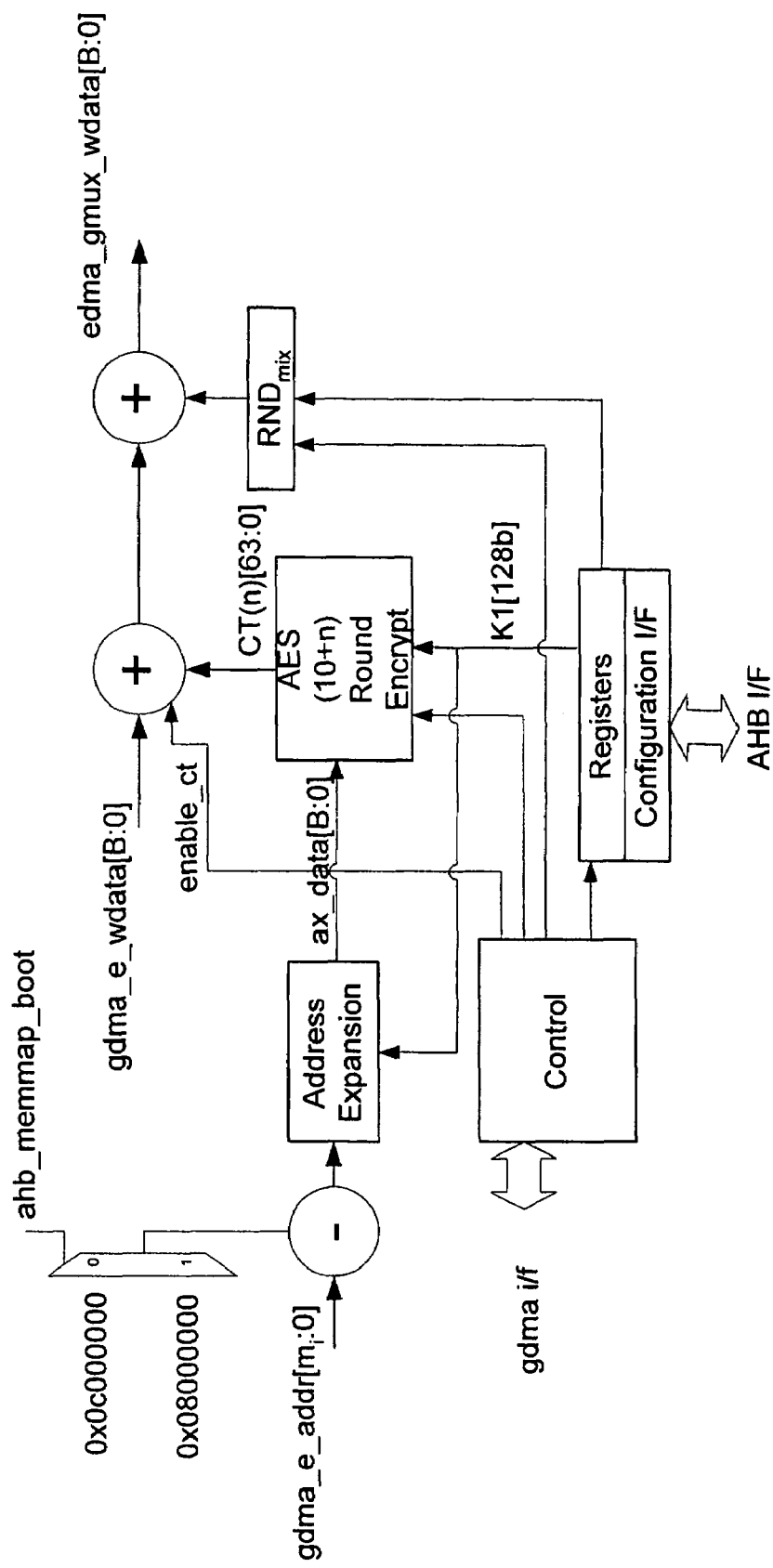
FIG. 7 is a block diagram illustrating the EDMA block in accordance with an embodiment of the present invention.
Figure 8:
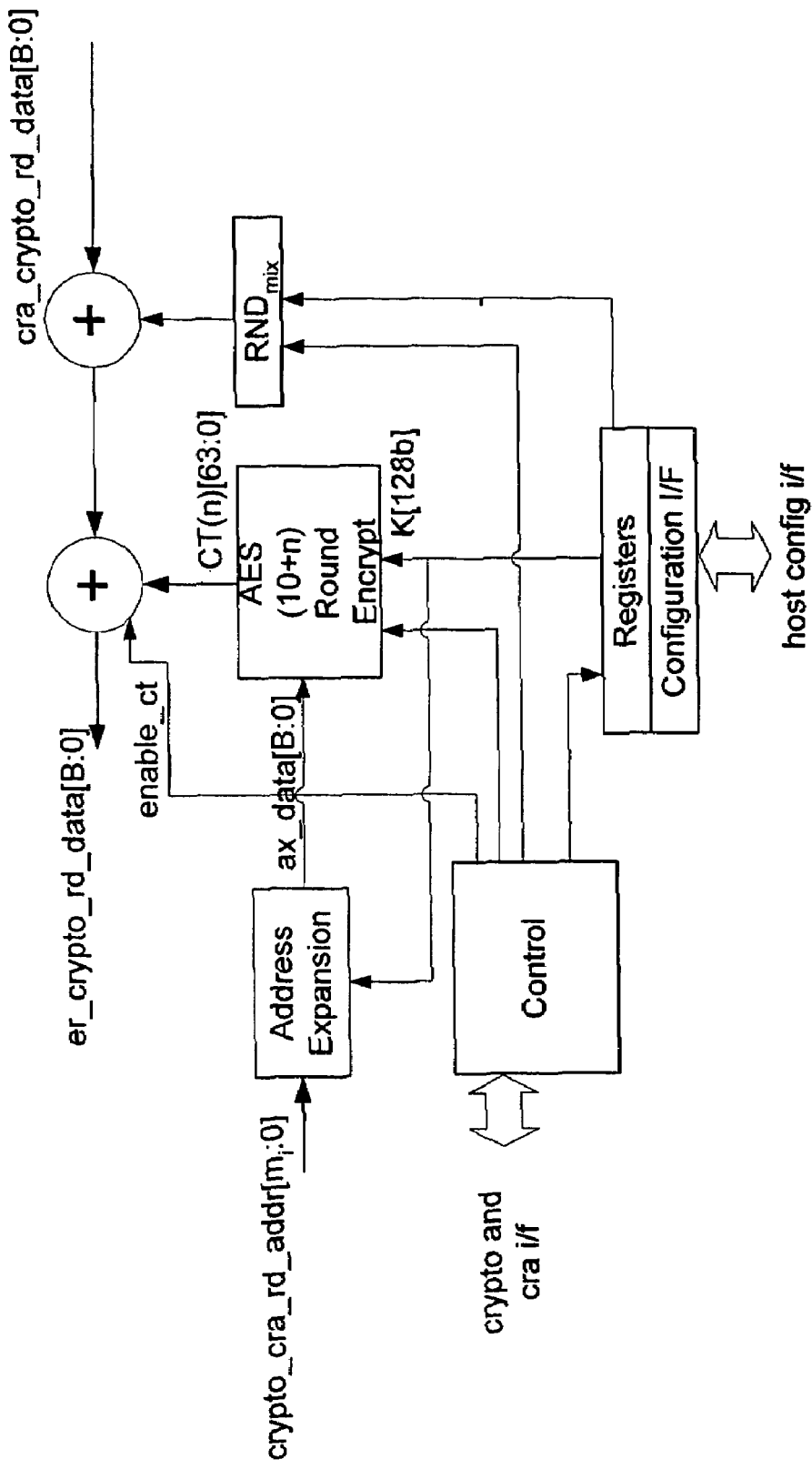
FIG. 8 is a block diagram illustrating the ER block in accordance with an embodiment of the present invention.

The EDMA block monitors the incoming data bus (e.g., GDMA signals) to determine if the current write request is protected data or a transfer which does not contain any protected data. This distinction may be controlled by signaling, for example, two control bits in a GDMA control word for each transfer. The signaling may also determine whether or not there is an offset to the beginning of encryption, allowing a block-sized multiple of clear text to precede the encrypted data in a single transaction. If the transfer is to be encrypted, for instance for an IPSec SA, the EDMA logic will hold off the request going to the AHB Master until the AES is ready, that is when the initial 10 rounds of AES are complete, and the block multiple clear text offset is reached, if it exists. The AES block will use the incoming data's Source Address (M) and K key to complete the initial 10 rounds. On completion of the 10 rounds, B bits of Cipher Text 0 (CT0) will be produced and the write request will be allowed to pass to the AHB Master. The AHB Master (in this example) will assert its read signal and the first 8-bytes of data will be allowed to transfer. On each of the remaining transfers the AES block will step one round of the AES algorithm per transfer and the data will be XOR'ed with CTn (n=0 . . . i) to produce $E_K[Datan]$ for a total transfer of n×8 bytes being encrypted. The EDMA block will not encrypt any transfer where the source address equals the destination address. A more detailed block diagram is illustrated in FIG. 7. The sections below describe each of these blocks in more detail.

$RND_{mix}$

The $RND_{mix}$ value will be initialized during the boot-up sequence as a 64-bit (or block size) random or pseudo-random number and then written to the EDMA $RND_{mix}$ register. The $RND_{mix}$ will be XOR'd with the cipher text XOR data and then be sent to the EDMA mux, providing additional mix protection to mitigate the weakness of "to 000 or FFF" writes to memory.

AES64 Encryption Block

The AES block preferably uses a reduced block size, 64-bit block AES (128-bit key) algorithm as defined in the Appendix to this application (AES64 Specification). Although the embodiment of the present invention is discussed in the context of this specific AES algorithm, one of skill in the art will recognize that other algorithms (e.g., other than AES) may be used in other embodiments. Although in the Appendix the number of rounds for the AES algorithm is defined as 10, for the EDMA or ER blocks the AES64 may be extended to support an 10+n round cipher, as determined by the size of the encrypted data transaction. For more detail, see the following table:

| PreAdd | |
|---|---|
| round 1 | SubBytes |
| round 1 | ShiftRows |
| round 1 | MixColumn |
| round 1 | AddKey |
| . | |
| . | |
| . | |
| round n | SubBytes |
| round n | ShiftRows |
| round n | (No MixColumn On Last Round) |
| round n | AddKey |

The output of rounds 11 through n will produce $CT_0$ through $CT_n$ which will be used to XOR with the eight byte blocks (for a 64-bit memory width) of the data transaction being written to off-chip memory. An initial, block multiple amount of data may be allowed to pass in the clear prior to the active encryption, based on any offset programmed into the transaction signaling.

EDMA Address Expansion Block

The address expansion block takes nm-bits of address data together with some amount of K data and produces block-sized bits of address expansion data for input to the AES block. The address expansion block may use S-Box and E-Box functions to accomplish the expansion, though other substitution or expansion algorithms may be used as long as they introduce sufficient variability. The address is typically expanded through the E-Box or some other expansion function. Some mixing bits are selected from K and run through a number of S-Box's or some other substitution function to produce data that will be XOR'd with the expanded address seed from the E-Box. The output from the XOR is then appended to the address (or data that is address dependant) to form a block-sized amount of output (ax_data[B:0]). In more detail, in formula form:

$$ax\_data[B:0] = \{gdma\_EDMA\_amemory[m_i:0], X_i[(B-m_i:0)]\}$$

ER Block (Cryptographic Core to/from Security Association (SA) Memory)

The ER block (e.g., for a four-channel slice) provides a read-only (e.g., IPSec) path from off-chip memory to the functional block or device reading the memory, for example, in the case where cryptographic core 232 would need to decrypt SA's that are located within off-chip memory. It may consist of several blocks that include an n-round, B-bit AES encrypt, address expansion, variable FIFO, control, and configuration. The ER block may be located between the memory-consuming function (e.g., cryptographic core 232) and off-chip memory as illustrated in more detail in FIG. 8. Multiple function blocks or devices may have their own or a shared ER block to memory.

The ER block monitors the calling block's request signals to the off-chip memory. If the request is a read, the ER block will hold off the completion of the read by de-asserting its ready signal (ER_rdy) to a memory arbiter until the AES block is ready (i.e., when the initial 10 rounds of AES64 are complete). The AES block will use the memory Source Address provided from the cryptographic core interface and the K key to complete the initial 10 rounds of AES64. On completion of the 10 rounds, 64 bits of Cipher Text 0 (CT0) will be produced and the ready signal (ER_rdy) will be asserted allowing the read request to pass to the memory arbiter. The memory Arbiter will assert its data ready signal and the data will be allowed to transfer. If an offset is included in the request signal, then a block multiple of data may precede the decrypted information in the clear. On each of the remaining transfers the AES block will step one round of the AES algorithm per transfer and the data will be XOR'ed with CTn (n=0 . . . 8) to produce $E1_K[Datan]$ for a total transfer of 8×n bytes being decrypted.

Host Configuration Interface (I/F)

A host configuration interface provides read/write access to local configuration and status registers.

$RND_{mix}$

The $RND_{mix}$ value will be initialized during the boot-up sequence as a 64-bit (or block size) random or pseudo-random number and then be written to the EDMA $RND_{mix}$ register. The $RND_{mix}$ will be XOR'd with the cipher text XOR data and then be sent to the EDMA mux, providing additional mix protection to mitigate the weakness of "to 000 or FFF" writes to memory.

AES Encryption Block

The AES block preferably uses a reduced-block size, 64-bit AES algorithm as defined in the Appendix to this application (AES Specification). Although the discussion in the Appendix defines the number of rounds as 10, for the ER block the AES block is able to support a 10+n round cipher, where n represents the number of bus width blocks of memory to be retrieved.

ER Address Expansion Block

The ER address expansion block may be implemented in the same way as the EDMA address expansion block.

Network Intrusion Detection System

Figure 3:
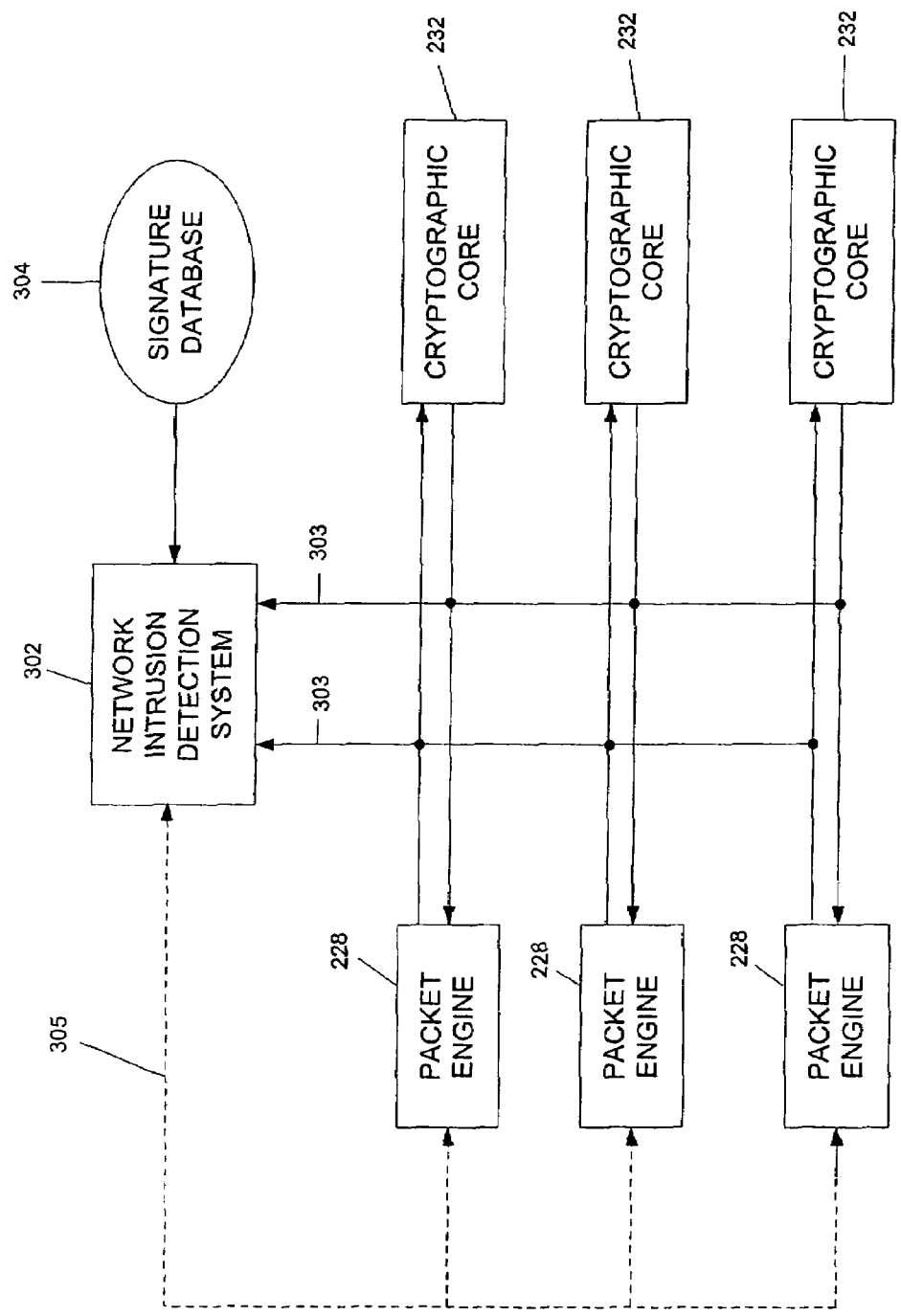
FIG. 3 illustrates a more-detailed functional block diagram of a network intrusion detection system used in a portion of the security processor of FIG. 2 in accordance with an embodiment of the present invention.

FIG. 3 illustrates a more-detailed functional block diagram of a network intrusion detection system that may be used in a portion of security processor 104 in accordance with an embodiment of the present invention. FIG. 3 illustrates, for example, three packet engines 228 in parallel and each connected to a cryptographic core 232.

Network intrusion detection system (NIDS) 302 has taps 303 that may couple to the input/output of each of packet engine 228 and cryptographic core 232 pair. Signature database 304 is a defined set of patterns stored in on and/or off-chip memory. NIDS 302 attempts to match parts of the data stream (for example, the header, payload, or trailer) against the stored set of patterns.

According to the present invention, by passing all I/O traffic to host processor 130 and/or internal network 116 through security processing system 102, and including NIDS 302 within system 102, undesirable intrusions may be detected in-line with such I/O traffic, such as, for example, it passes through an NIC. By being in-line in this manner, intrusions identified by NIDS 302 may be stopped in the I/O traffic flow and any further related improper intrusion prevented from passing to host processor 130 and/or internal network 116.

Each computer or computing device (not shown) connected, for example, to internal network 116 may be protected by security processing system 102, such as, for example, using an NIC containing security processing system 102 for all I/O traffic for each device. Each such distributed NIC may communicate with a central server (not shown) connected to internal network 116 to accumulate performance, security, network processing and other data related to activities reported by each such security processing system 102. Additionally, such accumulated data may be processed and/or analyzed by the central server and then new or modified control signals sent to all, or a selected portion, of the security processing systems 102 of each device on internal network 116.

Having a tap on each of the input and output paths to each cryptographic core 232 permits the capture of clear text packets either before or after encryption, depending on whether the packets are inbound or outbound. Thus, signature matching may be done on clear text data. NIDS 302 may flag a packet as having a potential signature match to a pattern in signature database 304. The flagged packet may either be dropped (and the flow of subsequent packets in the same data flow stopped) or continue to its next destination, with a logging report to host processor 130 in either case indicating the status of the packet. Also, in addition to being sent to its next destination, the flagged packet may be redirected or duplicated and receive further slow path processing by control processor 212. The logging report may be used to form an audit trail for collective or heuristic analysis and future packet inspection by a centralized intrusion detection system or other process or device. If a packet has been identified as undesirable, intrusion prevention may be provided by dropping related future packets in packet engines 228.

NIDS 302 may be coupled to a separate control channel 305 coupled back to one or more, and preferably all, of packet engines 228. Control channel 305 is a special path to send packets that have been flagged by NIDS 302 to the control plane on local data bus 210 (and then optionally on to host processor 130) for logging or other administrative tasks, including, for example, providing data for use by a network administrator in managing and improving network intrusion detection and prevention by security processing system 102.

Flagging of a packet or a packet data structure may be done by setting a bit flag in a control word corresponding to the packet. By examining this bit flag for a packet, control processor 212 may direct the packet to a certain location for logging. Results from packet classification performed by each packet engine 228 (for example, to determine that the packet is network file system (NFS) traffic) may be used to select from one of many rules sets or signature sets in signature database 304.

Based on comparisons to the selected rules or signature sets, control channel 305 may indicate one or more types of initial potential intrusion violations associated with a packet. After indicating flagged packets to one or more of packet engines 228 through control channel 305, each packet engine 228 may further classify the packet by comparison to the one or more types of other potential intrusion violations provided for the packet by control channel 305, and use information from prior classification processing for the packet by the packet engine 228 to narrow or eliminate the set of potential intrusion violations.

Packet/Data Flow

Figure 4:
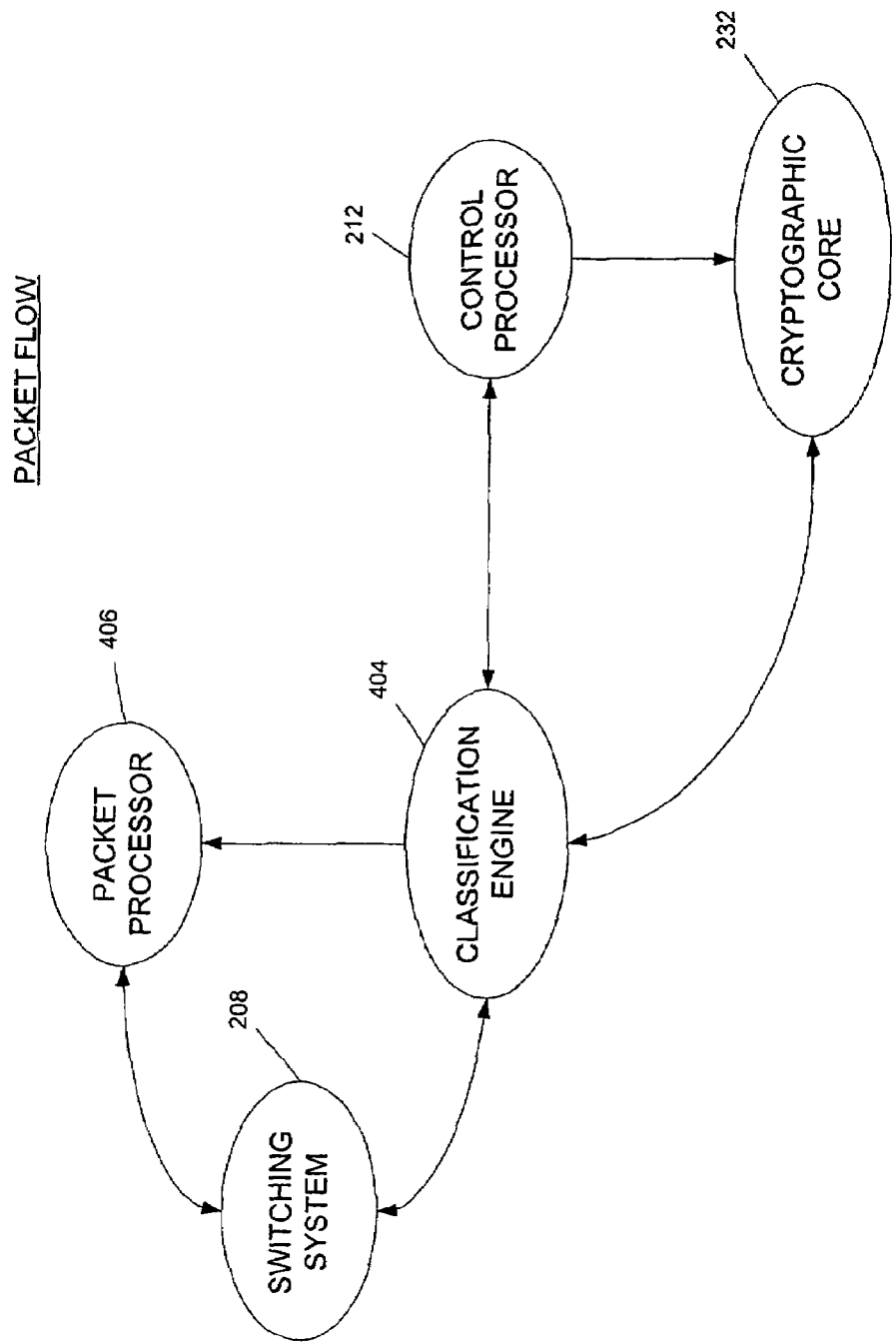
FIG. 4 illustrates a simplified flow diagram of packet flow in the security processor of FIG. 2.

FIG. 4 illustrates a simplified flow diagram of typical packet or data flow for one embodiment of security processing system 102. Each packet engine 228 may comprise a packet processor and a classification engine. Circles 404 and 406 generally correspond to the functionality provided by the classification engine and the packet processor, and such functionality is referred to herein as classification engine 404 and packet processor 406.

Classification engine 404 may provide lookup and decision logic for, among other things, security policy database (SPD) lookup, firewall connection table lookup, NAT table lookup, routing, and limited application level gateway (ALG) rule application and data mangling. Any or all of the foregoing classification engine functions may be subsumed in a single connection table entry. Once an initial data flow is defined, the foregoing classification engine functions may be made integral to the data flow.

Packet flow through security processing system 102 typically begins when a packet enters switching system 208 via one of streaming interfaces 200 or DMA interfaces 204. Each packet may be inserted into an active list waiting for the next available packet engine 228. The same active list may be an insertion path for control processor 212 to direct packet traffic into a packet engine 228. Regardless of destination, whether, for example, it is to streaming interface 200, host interface 206, control processor 212, or a loop through a packet engine 228, all packet data preferably flows to a packet engine 228 and then to a corresponding cryptographic core 232. Tagging of the packet upon ingress to the packet engine 228 may determine the egress path from cryptographic core 232. More specifically, the incoming and outgoing packets may be provided with a tag upon ingress to one of packet engines 228 and the tag may be used to determine the egress path upon exit from the corresponding cryptographic core 232.

Classification hash lookup data and a detailed connection flow table and security policy/association data may be stored, for example, in memory 106. Upon receiving a packet, packet engine 228 may find a match in the connection table, fetch the connection information (including SAD information as appropriate), and apply the appropriate rules and transforms. This may include forwarding the packet to control processor 212. If no match is found in the connection table, then the packet is preferably forwarded to control processor 212.

Outbound packets may be buffered after transit through packet engine 228 and cryptographic core 232 for sending out to streaming interface 200 or to host interface 206. Outbound packets may have made a single trip through packet engine 228 and core 232, may have made a second trip through packet engine 228 and core 232 after prior processing by control processor 212, or may have made a second trip through packet engine 228 for firewall inspection following decryption in cryptographic core 232.

Initial packets needing classification to create a NAT lookup table entry and/or firewall connection table entry may be forwarded to control processor 212 for processing, then back to classification engine 404, and then to packet processor 406 prior to output from security processor 104 (unless dropped in accordance with the firewall rules in effect). If such initial packets also need IPSec processing, they may be forwarded to packet engine 228 after initial processing by control processor 212, then back to an egress interface.

For packets that are already in an existing data flow, for example, already having connection table entries or NAT global mapping in existence, a successful lookup may result in a direct forwarding to packet processor 406 for modification, and then classification by classification engine 404 for egress from security processor 104. Outbound IPSec packets in an existing flow transit to packet engine 228 and cryptographic core 232 after egress classification and firewall packet processing. Inbound IPSec packets in an existing flow are forwarded to packet engine 228 and cryptographic core 232, then to the classification engine 404 and packet processor 406 for SPD validation, routing, and optionally, firewall and NAT processing prior to egress.

APPENDIX

An APPENDIX is included at the end of this application, which is incorporated by reference in full herein. The APPENDIX describes the AES64 algorithm referenced above. The APPENDIX presents information regarding a specific algorithm and is not intended to be limiting in any way. Other implementations of the present invention may be made.

CONCLUSION

By the foregoing description, an improved secure I/O interface system and method have been described. The system and method may improve the security of communications to and from trusted hardware, improve communication speed, reduce the number of different systems required for secure communications, and reduce the extent of the bottleneck on the backplane bus.

The foregoing description of specific embodiments reveals the general nature of the invention sufficiently that others can, by applying current knowledge, readily modify and/or adapt it for various applications without departing from the generic concept. Therefore, such adaptations and modifications are within the meaning and range of equivalents of the disclosed embodiments. The phraseology or terminology employed herein is for the purpose of description and not of limitation. Accordingly, the invention embraces all such alternatives, modifications, equivalents and variations as fall within the spirit and scope of the appended claims.

APPENDIX (AES64 Specification)
REF: The Rijndael Block Cipher (Joan Daemen and Vincent Rijmen)
Intro
*****
This paper describes a codebook algorithm denoted AES64. AES64, which is derived from AES (formerly called Rijndael), operates on a reduced block size of 64 bits. Although AES is defined for block sizes of 128, 192, and 256 bits, all of the operations apply equally well to a block size of 64 bits, with the possible exception of the ShiftRow( ) transformation -- since this becomes somewhat trivial for the AES64 case of two bytes per row, ShiftRow( ) has been changed to operate on nibbles within a row instead of bytes. The security of AES64 rests on the widely accepted security of AES.
For AES64, we specify the following parameters:
    (1) blocksize: 64 bits (8 bytes)
    (2) key length: 128 bits (16 bytes)
    (3) number of rounds: 10
    (4) mode: ECB (Electronic Code Book)
Notation
********
Throughout this note as well as the accompanying source code, all values are viewed as byte sequences:
    Block: BYTE *a = (a0 a1 a2 ... a7)
    Key: BYTE*k = (k0 k1 k2 ... k15)
    Expanded key: BYTE *W = (w0 w1 w2 ... w87)
Block values include input, output, and intermediate cipher; REF typically refers to all of these values as "state."
Using this notation, the round keys break out as:
Round 0 ( w0 w1 w2 w3 w4 w5 w6 w7)
Round 1 ( w8 w9 w10 w11 w12 w13 w14 w15)
Round 2 (w16 w17 w18 w19 w20 w21 w22 w23)
Round 3 (w24 w25 w26 w27 w28 w29 w30 w31)
......
Round 13 (w72 w73 w74 w75 w76 w77 w78 w79)
Round 14 (w80 w81 w82 w83 w84 w85 w86 w87)
The Round 0 key is the "preadd" key. Because the AES64 blocksize is small relative to the key length, the first two rounds are actually just the input key (i.e. w(i) = k(i) for i=0,...,15).
In REF, the basic transformations (KeyAdd, ByteSub, ShiftRow, MixColumn) are described as operating on byte-valued state matrices all with exactly four rows. Each column corresponds to a 32-bit word (type unsigned int in C). To map one of the byte sequences described above to a state matrix, inscribe the bytes down the columns moving top to bottom and left to right -- that is, an input byte string
    a[8] = a0 a1 a2 a3 a4 a5 a6 a7
corresponds to the state matrix
    a0 a4
A[2][4] = a1 a5
    a2 a6
    a3 a7

APPENDIX-continued

The KeyAdd and ByteSub transforms operate on individual bytes, so can be described in terms of either representation equally well. The ShiftRow and MixColunm transforms are defined in terms of the state matrix, with ShiftRow transforming rows and MixColumn transforming columns. In the source code, the mapping from byte string to state matrix is accomplished through indexing:
    A[i][j] = a[4*i + j]
This may seem backwards -- index i refers to column and index j to row -- but this corresponds directly to the way that the C language stores multi-dimensional matrices.
Keys and Key schedule
*********************
AES64 uses the AES key schedule (as described in REF for the case Nk=4). The input key is 16 bytes long. AES64 requires 8 bytes of key for the pre-add and 8 bytes of key for each round, for a total of 11*8 = 88 bytes. Each round of the key scheduler produces 16 bytes of key. The routine aes64KeySched( ) actually computes 96 bytes of expanded key in six rounds and then copies the first 88 bytes into the output array. Comparing the pseudocode in REF to aes64KeySched( ) will probably lead to some confusion since REF describes it in terms of word operations, but these ops are all byte oriented so the translation is fairly straightforward using the equivalence
    word W(i) == bytes w(4*i) w(4*i+1) w(4*i+2) w(4*i+3)
Component transforms
********************
As noted above, AES64 consists of the same transformations as AES/Rijndael with the exception of ShiftRow( ). In what follows, each transformation produces an eight byte output state (b0 ... b7) by operating on an eight byte input state (a0 ... a7):
Key Addition -- XOR key material with data block
    b(i) = a(i) ^ w(8*r +i) for i=0,...,7
where r denotes the round number.
Substitution -- Apply the AES S-box function to data bytes
    b(i) = S[a(i)] for i=0,...,7
InvSubstitution -- Apply Sinv box function to data bytes
    b(i) =Sinv[a(i)] for i=0,...,7
MixColumn -- Matrix multiply (the state is a 4×2 byte matrix)
    b0 b4    02 03 01 01    a0 a4
    b1 b5 = 01 02 03 01 × a1 a1    overGF(256)
    b2 b6    01 01 02 03    a2 a6
    b3 b7    03 01 01 02    a3 a7
Or
    b0 = mul(02,a0) ^ mul(03,a1) ^ mul(01,a2) ^ mul(01,a3)
    b1 = mul(01,a0) ^ mul(02,a1) ^ mul(03,a2) ^ mul(01,a3)
    b2 = mul(01,a0) ^ mul(01,a1) ^ mul(02,a2) ^ mul(03,a3)
    b3 = mul(03,a0) ^ mul(01,a1) ^ mul(01,a2) ^ mul(02,a3)
    b4 = mul(02,a4) ^ mul(03,a5) ^ mul(01,a6) ^ mul(01,a7)
    b5 = mul(01,a4) ^ mul(02,a5) ^ mul(03,a6) ^ mul(01,a7)
    b6 = mul(01,a4) ^ mul(01,a5) ^ mul(02,a6) ^ mul(03,a7)
    b7 = mul(03,a4) ^ mul(01,a5) ^ mul(01,a6) ^ mul(02,a7)
where mul(x,y) is multiplication of x and y in GF(256).
InvMixColumn -- like MixColumn, but uses inverse transform
    b0 b4    0E 0B 0D 09    a0 a4
    b1 b5 = 09 0E 0B 0D × a1 a5    over GF(256)
    b2 b6    0D 09 0E 0B    a2 a6
    b3 b7    0B 0D 09 0E    a3 a7
ShiftRow -- Modified from AES to do nibble shifts vs. byte shifts
    b0 b4    a0H a0L a4H a4L    rotate left 0 nibbles
    b1 b5 = a1L a5H a5L a5H    rotate left 1 nibbles
    b2 b6    a6H a6L a2H a2L    rotate left 2 nibbles
    b3 b7    a7L a3H a3L a7H    rotate left 3 nibbles
where a byte a0 is written as the high/low nibbles (a0H a0L)
InvShiftRow -- The obvious thing; rotate right instead of left
    b0 b4    a0H a0L a4H a4L    rotate right 0 nibbles
    b1 b5 = a5L a1H a1L a5H    rotate right 1 nibbles
    b2 b6    a6H a6L a2H a2L    rotate right 2 nibbles
    b3 b7    a3L a7H a7L a3H    rotate right 3 nibbles
Round Function
**************
The round functions for AES64 are exactly as in AES. To encrypt,
Initial key add (preadd, aka whitening)
For r=1,...,9
    Substitution
    ShiftRow
    MixColumn
    KeyAddition

APPENDIX-continued

Final (oddball) round
    Substitution
    ShiftRow
    KeyAddition
and to decrypt,
Initial (oddball) round
    KeyAddition
    InvShiftRow
    InvSubstitution
For r=9,...,1
    KeyAddition
    InvMixColumn
    InvShiftRow
    InvSubstitution
Final key add (strips off whitening)
An Example
**********
Encryption
Input 0123456789abcdef
Key 000102030405060708090a0b0c0d0e0f
Key expansion algorithm (16 bytes per pass)
Pass 0: 00010203 04050607 08090a0b 0c0d0e0f
Pass 1: d6aa74fd d2af72fa daa678f1 d6ab76fe
Pass 2: b692cf0b 643dbdfl be9bc500 6830b3fe
Pass 3: b6ff744e d2c2c9bf6c590cbf0469bf41
Pass 4: 47f7f7bc 95353e03 f96c32bc fd058dfd
Pass 5: 3caaa3e8 a99f9deb 50f3af57 adf622aa
Expanded key by round
Round 0: 00010203 04050607 (preadd)
Round 1: 08090a0b 0c0d0e0f
Round 2: d6aa74fd d2af72fa
Round 3: daa678f1 d6ab76fe
Round 4: b692cf0b 643dbdf1
Round 5: be9bc500 6830b3fe
Round 6: b6ff744e d2c2c9bf
Round 7: 6c590cbf 0469bf41
Round 8: 47f7f7bc 95353e03
Round 9: f96c32bc fd058dfd
Round 10: 3caaa3e8 a99f9deb
** input 01234567 89abcdef
** whitened 01224764 8daecbe8
** round 1 sub 7c93a043 5de41f9b
** round 1 shftd 7c3e1fb4 5d49a039
** round 1 mixed 1195bbd6 f80d047c
** round 1 added 199cb1dd f4000a73
** round 2 sub d4dec8cl bf63678f
** round 2 shftd d4e667fc bf3dc818
** round 2 mixed 1956e305 f29e211f
** round 2 added cffc97f8 203153e5
................
** round 9 sub 28d45822 59fef902
** round 9 shftd 284ff922 59ed5820
** round 9 mixed 5a84e88a e650641e
** round 9 added a3e8da36 1b55e9e3
** round 10 sub 0a9b5705 affclel1
** round 10 shftd 0abf1e10 afc95751
   (note no MixColumn last round)
** round 10 added 3615bdf8 0656caba
Output: 3615bdf8065caba
Decryption -- Key and expanded key identical to encryption above.
Input: 3615bdf80656caba
** input 8db33771 ac477fb5
** round 10 added 0abf1e10 afc95751
(note no InvMixColumn first round)
** round 10 invshft 0a9b5705 affcle11
** round 10 invsub a3e8da36 1b55e9e3
** round 9 added 5a84e88a e650641e
** round 9 invmix 284ff922 59ed5820
** round 9 invshft 28d45822 59fef902
** round 9 invsub eel95e94 150c696a
...................
** round 2 added 1956e305 f29e211f
** round 2 invmix d4e667fc bf3dc818
** round 2 invshft d4dec8c1 bf63678f
** round 2 invsub 199cb1dd f4000a73
** round 1 added 1195bbd6 f80d047c
** round 1 invmix 7c3e1fb4 5d49a039

APPENDIX-continued

** round 1 invshft 7c93a043 5de41f9b
** round 1 invsub 01224764 8daecbe8
** dewhitening 01234567 89abcdef
Output: 0123456789abcdef

What is claimed is:

1. A security processor to process incoming packets and outgoing packets, the security processor comprising:
    a switching system to send the outgoing packets and receive the incoming packets;
    a packet engine, coupled to the switching system, to handle classification processing for the incoming packets received by the packet engine from the switching system and the outgoing packets sent by the packet engine to the switching system, wherein the packet engine is one of a plurality of packet engines and substantially all of the incoming packets and outgoing packets to the security processor transit one of the plurality of packet engines, and wherein the incoming packets and outgoing packets are provided with a tag upon ingress to one of the plurality of packet engines and the tag determines an egress path within the security processor upon exit from a corresponding cryptographic core;
    a cryptographic core, coupled to the packet engine and receiving the incoming packets from the switching system via the packet engine and communicating the outgoing packets to the switching system via the packet engine, to provide encryption and decryption processing for packets received from and sent to the packet engine, wherein the packet engine is interposed between the switching system and the cryptographic core;
    a signature database; and
    an intrusion detection system coupled between the cryptographic core and the packet engine and responsive to at least one packet matching a signature stored in the signature database.

2. The security processor of claim 1 wherein the packet engine is further operable to handle security context management processing for the incoming and outgoing packets.

3. The security processor of claim 1 further comprising:
    a local data bus coupled to the switching system; and
    a modulo engine coupled to the local data bus.

4. The security processor of claim 3 wherein the packet engine, the cryptographic core, and the modulo engine are formed on a single chip.

5. The security processor of claim 4 further comprising a control processor, coupled to the local data bus, for exception handling of the incoming and outgoing packets.

6. The security processor of claim 4 further comprising a key management engine coupled to the local data bus.

7. The security processor of claim 4 wherein the security processor handles substantially all security processing for the incoming and outgoing packets.

8. The security processor of claim 7 wherein the security processor further handles substantially all network processing for the incoming and outgoing packets.

9. The security processor of claim 1 wherein the cryptographic core is one of a plurality of cryptographic cores coupled one-to-one to the plurality of packet engines and substantially all of the incoming and outgoing packets to the security processor transit a corresponding one of the plurality of cryptographic cores after transiting one of the plurality of packet engines.

10. The security processor of claim 1 wherein the packet engine is further operable to add at least one of an IP header or a MAC address to the outgoing packets.

11. The security processor of claim 1 wherein the packet engine is further operable to remove an IP header from the incoming packets.

12. The security processor of claim 1, wherein the at least one packet matching the signature stored in the signature database comprises a plain text packet.

13. A security processing system comprising:
(a) a security processor comprising:
a switching system to send outgoing packets and to receive incoming packets;
a packet engine, coupled to the switching system, to handle classification processing for the incoming packets received by the packet engine from the switching system and the outgoing packets sent by the packet engine to the switching system, wherein the packet engine is one of a plurality of packet engines and substantially all of the incoming packets and outgoing packets to the security processor transit one of the plurality of packet engines, and wherein the incoming and outgoing packets are provided with a tag upon ingress to one of the plurality of packet engines and the tag determines an egress path within the security processor upon exit from a corresponding cryptographic core;
a cryptographic core, coupled to the packet engine and receiving the incoming packets from the switching system via the packet engine and communicating the outgoing packets to the switching system via the packet engine, to provide encryption and decryption processing for packets received from and sent to the packet engine, wherein the packet engine is interposed between the switching system and the cryptographic core;
a signature database; and
an intrusion detection system coupled between the cryptographic core and the packet engine and responsive to at least one packet matching a signature stored in the signature database; and
a local data bus coupled to the switching system; and
(b) a memory coupled to the local data bus.

14. The security processing system of claim 13 further comprising a modulo engine coupled to the local data bus.

15. The security processing system of claim 14 further comprising a key management engine coupled to the local data bus.

16. The security processing system of claim 13 wherein the memory and the security processor are within the same cryptographic boundary.

17. The security processing system of claim 13 wherein the security processor is formed on a single chip.

18. The security processing system of claim 13 further comprising:
a memory interface coupled to the local data bus, wherein the memory is coupled to the local data bus using the memory interface; and
a translator coupled to the memory interface to perform translation of data received by the memory interface from the memory.

19. The security processing system of claim 18 wherein the translator performs steganographic translation of the received data.

20. The security processing system of claim 18 wherein the translator performs encryption translation of the received data.

21. The security processing system of claim 13 wherein the security processor is operable to (i) execute boot code to load firmware for execution by the security processor and (ii) authenticate the boot code using a mechanism internal to the security processor prior to operation of the security processor.

22. The security processing system of claim 13, wherein the at least one packet matching the signature stored in the signature database comprises a plain text packet.

* * * * *